United States Patent
Alagianambi et al.

(10) Patent No.: US 12,066,977 B2
(45) Date of Patent: Aug. 20, 2024

(54) MANAGING ARCHIVING AND UNARCHIVING OPERATIONS AT A CONTENT COLLABORATION SYSTEM

(71) Applicants: Atlassian Pty Ltd., Sydney (AU); Atlassian Inc., San Francisco, CA (US)

(72) Inventors: Thirumalaivel Alagianambi, Mountain View, CA (US); Shaziya Tambawala, San Francisco, CA (US); Puneet Jain, San Francisco, CA (US); Ali Dasdan, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 295 days.

(21) Appl. No.: 17/559,009

(22) Filed: Dec. 22, 2021

(65) Prior Publication Data

US 2023/0195689 A1    Jun. 22, 2023

(51) Int. Cl.
*G06F 16/11* (2019.01)

(52) U.S. Cl.
CPC .................. *G06F 16/113* (2019.01)

(58) Field of Classification Search
CPC ...... G06F 16/113; G06F 16/93; G06F 16/168; G06F 16/11
See application file for complete search history.

(56) References Cited

U.S. PATENT DOCUMENTS

| | | | |
|---|---|---|---|
| 6,615,244 B1 * | 9/2003 | Singhal | G06F 16/958 709/227 |
| 7,260,584 B2 * | 8/2007 | Hailey | G06Q 10/10 707/999.102 |
| 7,707,153 B1 * | 4/2010 | Petito | G06Q 10/10 707/999.101 |
| 8,204,916 B2 * | 6/2012 | Dawson | G06F 16/156 707/805 |
| 9,001,064 B2 * | 4/2015 | Mesguich Havilio | G06F 3/04883 345/173 |
| 9,053,079 B2 * | 6/2015 | Bailor | G06F 16/93 |
| RE46,536 E * | 9/2017 | Chasen | G06F 16/9535 |
| 10,467,298 B2 * | 11/2019 | Mullins | G06F 16/316 |

(Continued)

*Primary Examiner* — Robert W Beausoliel, Jr.
*Assistant Examiner* — Susan F Rayyan
(74) *Attorney, Agent, or Firm* — Brownstein Hyatt Farber Schreck, LLP

(57) ABSTRACT

Embodiments include a content collaboration system that can be configured to display a hierarchical document tree that includes graphical objects corresponding to content items hosted by the content collaboration system. The collaboration system can receive a selection of a graphical object corresponding to a content item for archiving, and in response, generate a first updated hierarchical relationship that includes the archived content item and generate a second updated hierarchical relationship that excludes the archived content item. The collaboration system can construct a first hierarchical document tree instance based on the first updated hierarchical relationship for displaying the graphical objects for the first user account and construct a second hierarchical document tree instance based on the second updated hierarchical relationship for displaying the graphical objects for a second user account.

20 Claims, 17 Drawing Sheets

(56) References Cited

U.S. PATENT DOCUMENTS

| | | | |
|---|---|---|---|
| 11,734,501 B1* | 8/2023 | Gui | G06F 16/986 |
| | | | 715/256 |
| 11,836,372 B2* | 12/2023 | Bruckner | G06F 3/0605 |
| 2006/0053380 A1* | 3/2006 | Spataro | G06Q 10/10 |
| | | | 709/204 |
| 2006/0085245 A1* | 4/2006 | Takatsuka | G06Q 10/10 |
| | | | 705/7.12 |
| 2006/0085435 A1* | 4/2006 | Farn | G06F 16/9027 |
| 2008/0201552 A1* | 8/2008 | Tokie | G06F 16/93 |
| | | | 711/204 |
| 2010/0070930 A1* | 3/2010 | Thibault | G06F 16/38 |
| | | | 715/854 |
| 2012/0047112 A1* | 2/2012 | Steffan | G06F 16/93 |
| | | | 707/662 |
| 2014/0289134 A1* | 9/2014 | Sutton | G06Q 10/101 |
| | | | 709/206 |
| 2014/0359432 A1* | 12/2014 | Du | G06F 40/186 |
| | | | 715/255 |
| 2017/0154065 A1* | 6/2017 | Raghavan | G06F 16/211 |
| 2018/0025084 A1* | 1/2018 | Conlan | G06F 16/24578 |
| | | | 707/734 |
| 2020/0067997 A1* | 2/2020 | Hardee | G06F 40/166 |
| 2020/0193263 A1* | 6/2020 | Pham | G06Q 10/103 |
| 2020/0356528 A1* | 11/2020 | Prasad | H04L 69/04 |
| 2021/0136024 A1* | 5/2021 | Luthra | G06F 16/94 |
| 2021/0224255 A1* | 7/2021 | Mansour | H04L 51/04 |
| 2023/0101588 A1* | 3/2023 | Dasdan | G06Q 10/101 |
| | | | 715/234 |
| 2023/0370467 A1* | 11/2023 | Cavalcanti | H04L 63/105 |

* cited by examiner

MANAGING ARCHIVING AND UNARCHIVING OPERATIONS AT A CONTENT COLLABORATION SYSTEM

FIELD

The described embodiments relate to services of a content collaboration platform and, in particular, to systems and methods for archiving and unarchiving documents and displaying corresponding graphical objects.

BACKGROUND

Organizations may compile and manage one or more content collaboration networks that include information related to the organization's technology infrastructure or other resources. The content collaboration network can include content generated by various users of the information network, which may relate to current projects that a user is working on. The content collaboration network can include content generated at many different times. Users of the system typically access content using search functions, page trees, navigation menus or other navigation functions. Some content hosted by the content network can become outdated or infrequently accessed, but may still be displayed in search results or navigation menus.

SUMMARY

Embodiments are directed to methods for managing archiving of content items associated with a content collaboration system. The methods can include displaying a hierarchical document tree in a first user interface instance associated with a first user account, where the hierarchical document tree includes graphical objects corresponding to content items hosted by the content collaboration system. The graphical objects can be arranged according to a hierarchical relationship of the content items. The methods can also include receiving, from a first client device associated with the first user account, a selection of a graphical object corresponding to a content item. In response to receiving the selection of the graphical object, the methods can include assigning an archived status to the content item and generating a first updated hierarchical relationship of the content items, where the first updated hierarchical relationship can be based on the hierarchical relationship of the content items and indicating the archived status of the content item. Methods can also include constructing a first hierarchical document tree instance for displaying the graphical objects for the first user account, where the first hierarchical document tree instance is based on the first updated hierarchical relationship of the content items and includes a graphical object that indicates the archived status of the content item. The methods can further include generating a second updated hierarchical relationship of the content items that excludes the content item, and constructing a second hierarchical document tree instance for displaying the graphical objects for a second user account. The second hierarchical document tree instance can be displayed based on the second updated hierarchical relationship of the content items. In response to the first client device requesting display of the hierarchical document tree, the method can include displaying in the first user interface instance the first hierarchical document tree instance. In response to a second client device associated with the second user account requesting display of the hierarchical document tree, the method can include displaying in a second user interface instance the second hierarchical document tree instance.

Embodiments are also directed to method for administering archiving of content items associated with a content collaboration system. The methods can include displaying a hierarchical document tree in a user interface instance associated with an administrative account, where the hierarchical document tree includes graphical objects corresponding to content items associated with multiple user accounts. The method can include receiving, from a client device associated with the administrative account, a selection of a graphical object corresponding to a content item associated with a second user account. In response to receiving the selection of the graphical object, the methods can include assigning an archived status to the content item and generating an updated hierarchical relationship of the content items, where the updated hierarchical relationship based on a hierarchical relationship of the content items associated with the multiple user accounts and indicates the archived status of the content item. The methods can also include constructing a hierarchical document tree instance for displaying the graphical objects for the administrative account, where the hierarchical document tree instance is based on the updated hierarchical relationship of the content items and comprising a graphical object that indicates the archived status of the content item. In response to the client device requesting display of the hierarchical document tree, the methods can include displaying in the user interface instance the hierarchical document tree instance.

Embodiments are further directed to methods for managing archiving actions at a content collaboration system. The methods can include displaying a hierarchical document tree in a navigation pane of a user interface for the content collaboration system, where the hierarchical document tree includes graphical objects corresponding to content items hosted by the content collaboration system. The methods can include determining that one or more of the content items satisfy a first criteria. In response to determining that the one or more content items that satisfy the first criteria, the methods can include archiving the one or more content items, constructing a second hierarchical document tree having graphical objects associated with the one or more content items suppressed and constructing an archived hierarchical document tree comprising graphical objects corresponding to the one or more content items selected for archiving. The archived hierarchical document tree can be arranged according to a hierarchical relationship of the one or more content items. The methods can include determining that an archived content items satisfies a second criteria and in response to determining that the archived content items that satisfies the second criteria receiving a selection of a parent node for the archived content item, restoring the archived content item, and constructing a third hierarchical document tree that includes the restored archived content item arranged according to the selection of the parent node.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
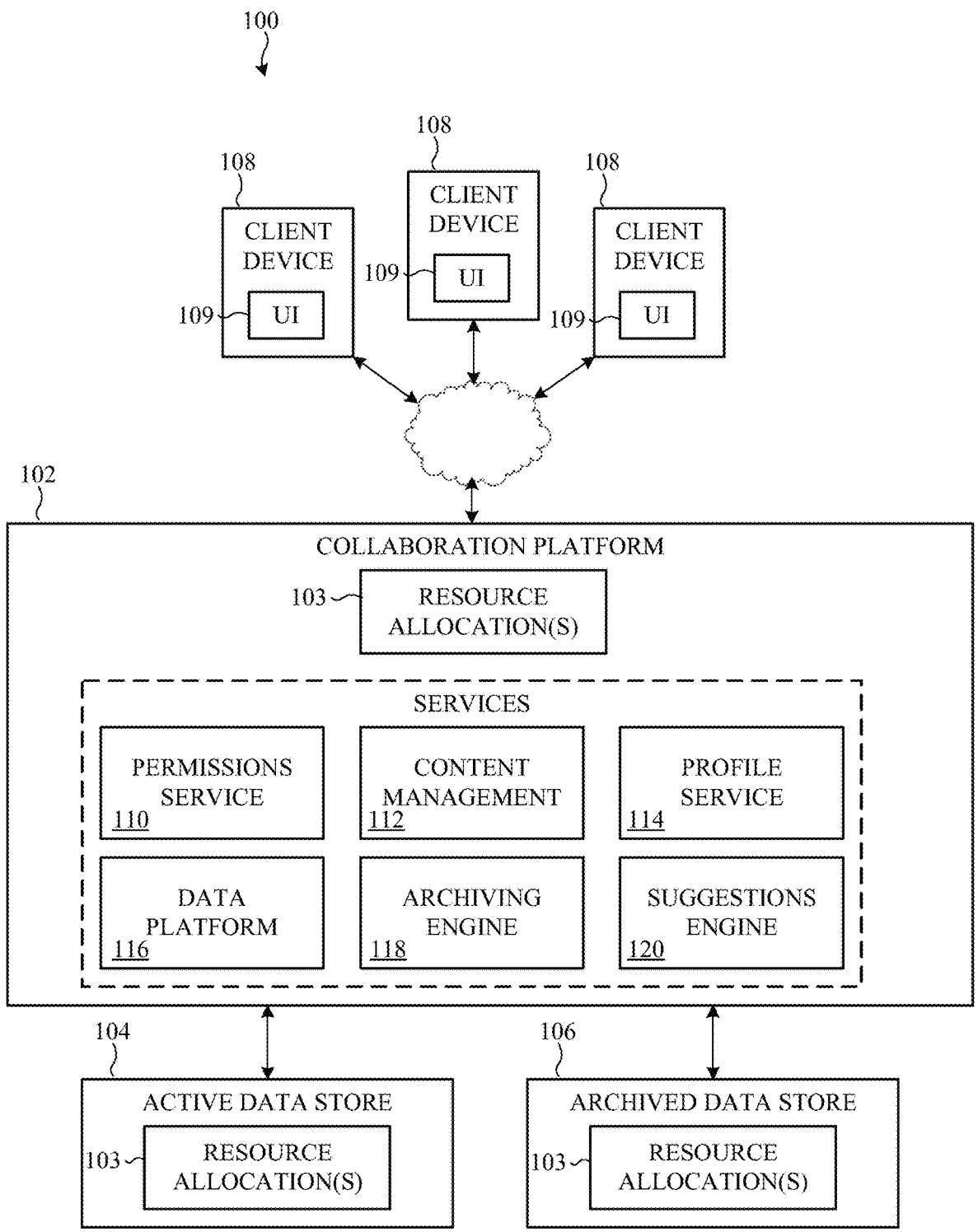
FIG. 1 shows an example collaboration system for generating automations for documents hosted by the collaboration system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to systems and methods for archiving and unarchiving content items at a content collaboration system. A content collaboration system can be set up to enable various users within and external to an organization to create, manage, share, and communicate information about various topics. The collaboration system can allow users to create content items, which can include documents, shared pages, videos, audio, slides, presentations and/or other content that can be shared with users of the system. The content collaboration system can also provide tools to create, edit and organize content under different topics, groups, or otherwise share content with users of the collaboration system. Additionally or alternatively, a user may be able to post and/or associate their content with internal and/or external pages, such as team, group or topic pages. The collaboration system can organize, group, host and share content in a variety of ways, and users of the system may determine how their content gets posted and/or shared.

Such a system may not evaluate the merits of content items, and thus, some content items may become outdated, less helpful or contain incorrect information as the organization and projects evolve. Additionally, as the number of content items increases, it may be difficult to find relevant content and/or determine which content items are current. Further, the informal nature of generating and posting content items can result in large numbers of relatively unused/un-accessed content items being actively maintained and hosted by the system, which can reduce the performance of the collaboration system. For example, maintaining large numbers of active but un-accessed content items can create lags in searching, navigating, loading and locating content items.

The systems and methods described herein are directed to archiving operations that are performed at the content collaboration system. Archiving functionality may be provided as a non-permanent method for removing content items from being actively displayed and/or managed by the content collaboration system. For example, archived items may be removed from being displayed in some contexts to help reduce the number of content items being hosted by the system. This may improve the efficiency of the system by enabling faster searching, navigation, and loading of the active content items. Users of the system may also be more willing to archive content items as opposed to deleting them due to the less permanent nature of an archiving operation. Further, if projects and/or teams are revived at a later point archiving can provide an efficient storage for dormant projects that allows previously created content to be revived if or when it becomes relevant again.

The content collaboration system described herein may organize content items according to a hierarchical structure. Using a hierarchical structure, content items can be related to other content items, groups, spaces and so on based on a defined hierarchy. For example, a content item can have a parent object (also referred to as a parent node), which it depends from and one or more child objects which depend from the content item. The content collaboration system can implement a user interface that displays graphical objects that represent the content items. The graphical objects can be displayed in a format the indicates the hierarchical relationship. For example, the graphical objects can be arranged in a hierarchical document tree structure, which organizes the graphical objects according to their dependency.

As content items are archived, the hierarchical relationships between the unarchived content items may change. For example, a hierarchical relationship of children of an archived content item may need to be redefined. Further, an archived content item may have incoming or outgoing links that become unfunctional upon archiving. Accordingly, archiving of an integrated content item can create issues with other content items that are not being archived. Further, as content items are archived, it may be desirable to have an organization scheme for archived content items, such as a scheme that preserves the hierarchical structure of the archived content items, which may allow archived content items to be searched and/or restored to an active status.

In some cases, moving content to an archived storage can be done by a number of different users and the process can be permissions based. For example, a content creator or owner may be able to archive their own content and the content collaboration system may also include administers that can have permissions to archive content created by or owned by other users. However, this complex scheme can result in content items seemingly disappearing from the system once they are changed to an archived status. In these cases, it may be difficult for users to find and/or revive archived content.

Embodiments are directed to systems and methods that manage and display archived content items differently for different users. In some cases, a creator of content items can select one or more of their content items for archiving. The collaboration system can update the selected content items to an archived status, and in response to archived status, the content collaboration system can update hierarchical relationships of the unarchived and archived content items. In some cases, these hierarchical relationships and/or how the archived content items are displayed can be different based on the user's permissions and/or relation to the content item. For example, a first user who created the content item may view limited version of the content item within their hierarchical document tree. This can include displaying a data object that indicates that the content items are archived, but is displayed with the hierarchical relationship that the content item had prior to being archived. Accordingly, an owner and/or administrator may be able to view, which content items have been archived and their relationship to other content items. This may help a user to determine whether archiving of the content was appropriate and/or allow the user to easily restore the content item.

A second user of the system may have different permissions for the content item such as permissions to view, comment on, like, link and so on. However, the second user may not have permissions to archive, edit or make other changes to the content item that the first user had. Based on these different permissions, when the content item was switched to an archive status, the content item may be removed from the users hierarchical document tree. For example, the second user may no longer be able see the archived content item in a list of active content items, and/or may not be able to locate the content item in a search. The hierarchical relationship of active content items can be updated based on the content item being archived. For example, if the archived content item had other dependent items, these dependent content items may be reassigned to the parent node of the archived content item. Additionally or alternatively, graphical objects that are used to represent these content items may be updated in the hierarchical document tree to reflect this change in hierarchy. Accordingly, the second user may have a different page tree view as a result of the first user moving the content item to archived storage.

In some embodiments, the content collaboration system can include tools that allow users of the system to define/update hierarchical relationships of content items when they are moved to archived storage or moved from unarchived storage to an active data storage. For example, when a content item is archived, the content collaborations system may provide the option to archive one or more dependent content items at the same time.

In other cases, the content collaboration system may include a bulk management tool that allows an administrator or other user with adequate permission to view multiple content items hosted by the system and owned and/or created by multiple users. The bulk management tool may allow the administrator to select various one of the content items for archiving. Given that content items with different hierarchical relationships may be selected, the content collaborations system may redefine and/or update the hierarchical relationship of unarchived (active) content items based on content items that are selected for archiving. Additionally or alternatively, the content collaborations system may create and/or update hierarchical relationships of the archived content items. The content collaboration may provide an archived content view, which can allow users to see the archived content and hierarchical relationships of the archived content items.

In some embodiments, the content collaboration system can identify candidate content items for archiving and make suggestions to a user to archive these content items. Identifying candidate content items can be based on various metrics including an age of a content item, usage such as page views, the last time the content item was viewed, the last time the content item was updated and so on. In some cases, the content collaboration system can track a user interaction with the system and make suggestions to archive and/or unarchive content items based on the user's activity.

The collaboration system can track and/or evaluate users' interactions with various graphical objects to determine whether changes should be made to the corresponding content items. For example, the collaboration system can identify in-frequently accessed content items and generate automation rules for archiving or moving these content items to longer term storage. The collaboration can generate an automation rule for archiving these content items and present the automation rule to a user of the system. The automation rule can include an explanation of the conditions that would trigger the rule, the actions associated with the rule, and identify a set of content items that would be affected by the rule. In some cases, presenting the automation rule in a user interface can include generating a preview of the effect of the rule on the content items. In response to a user accepting the automation rule, the collaboration system can execute the actions of the rule to the affected content items. For example, an automation rule can specify that all pages that are below a defined access count (e.g., infrequently accessed) are to be archived. In response to the user accepting the automation rule, the collaboration system can archive content items meeting the archiving condition. In some embodiments, displaying an automation rule to a user can include providing the user an option to modify the rule. Accordingly, the user may be able to change one or more parameters of the rule to change the set of content items affected by the rule.

In some embodiments, the collaboration system can generate automation rules for a variety of different content items to increase the efficiency of the system. For example, automation rules can be generated for displaying and organizing page trees that are used to navigate and find documents. In some cases, this can include determining that a branch level beyond a certain threshold is rarely accessed or that it is inefficient to have a single content item under a sub-branch. Accordingly, the collaboration system can generate an automation rule to reorganize the structure of the how the content items are displayed to a user. For example, the automation rule can recommend removing all page tree branches beyond a certain level, and/or reorganizing the documents associated with the eliminated branches. In other cases, the automation rule can recommend eliminating sub-branches that have a single content item and relocate and/or remove the content item. In other cases, the collaboration system can analyze historical data collected by the system and user interactions to identify automation rules for other documents such as generating document templates, modalities for sharing documents, scheduling contexts, alerts, organizing and/or displaying dashboards, creating workflows, migrating data and so on.

In other embodiments, the content collaboration system can evaluate an effect of archiving a content item, for example, based on its relation to other content items. For example, a content item may have a larger number of dependent content items (e.g., form primary node in a highly branched hierarchical structure) and archiving the content item would result in a large number of hierarchical relationships needing to be redefined. In other cases, a content item may be linked to by a number of other active content items, and thus, archiving the content item may cause these links to become inactive. The content collaboration system may develop a metric that characterizes the effect of archiving a content item. The metric can indicate how many and/or how larger of an effect archiving the content item would have on other content items.

As content items are archived, the content collaboration system described herein may redefine the hierarchical relationships between unarchived content items and the hierarchical document tree structure may be adjusted to reflect these changes. Additionally or alternatively, hierarchical relationships for archived content items may be generated based on their unarchived hierarchical structure and or user defined metrics.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 shows an example collaboration system 100 for managing archiving process for content items hosted by the collaboration system 100. The collaboration system 100 can include a collaboration platform 102, an active data store 104, an archived data store 106 and one or more client devices 108. The client device 108 can include a user interface application 109 that provides graphical interface to each client device. The user interface application 109 can interact with the collaboration platform to provide an instantiation of a client application for a specific user, which can display and/or provide functionality based on the user's permissions, role, or other the like.

In various embodiments, the collaboration system 100 is configured to operate within or as a virtual computing environment that is supported by one or more physical servers including one or more hardware resources which may be referred to as resource allocations 103. The resource allocations can include one or more of a processor; a memory; computer-readable memory or other non-volatile storage; networking connection; and the like, such as those in the electrical block diagram 1000 described with reference to FIG. 14. It may be appreciated that although these functional elements are identified as separate and distinct units (e.g., servers) they can each include allocations of physical or virtual resources, such as one or more processors, memory, and/or communication modules (e.g., network connections and the like). The collaboration system 100 can leverage such resources to instantiate a number of discrete subservices or purpose-configured modules, containers, or virtual machines each configured to perform, coordinate, serve, or otherwise provide one or more services, functions, or operations of the collaboration system 100, such as the collaboration platform 102, the active data store 104 and the archived data store 106.

The collaboration system 100 can be implemented as a content platform that provides a system for various users within and external to an organization to create, manage, share, and communicate about various topics. In some cases, the collaboration system 100 allows users to create, modify, comment on or otherwise share information through document pages that include text, pictures, videos or other suitable types of content. Users of the collaboration system 100 can create pages on various topics, share or otherwise publish their pages for other users to view. In some embodiments, other users, may be able to comment on modify or recommend modifications to a page, and/or link to other content hosted by the collaboration platform or hosted by a system external to the collaboration system 100.

In other cases, the collaboration system 100 can be implemented and/or integrated with other computer services or platforms to generate automations for task performed by these services or platforms. For example, the collaboration system 100 can be implemented as part of a code management system, an issue tracking system, email management systems, content feeds, chat systems or any other suitable system.

The collaboration platform 102 can manage client device 108 interactions with the collaboration system 100, which can include interactions such as creating, viewing, and modifying content that is hosted by the collaboration system 100. The collaboration platform 102 can interface with one or more client devices 108 to display graphical user interfaces of the collaboration system 100 on various client devices. The collaboration platform 102 can receive and process user inputs from a client device 108, communicate with other portions of the collaboration system and/or other services, and update the client device accordingly.

The collaboration platform 102 can include other API that are associated with other types of computer services and/or systems such as APIs that are part of a code management system, issue tracking system, content feed, chat system and so on. In this regard, the collaboration platform 102 can interface with various systems APIs to retrieve information related to actions performed by these services.

The collaboration platform 102 can include a permissions service 110 can enable which actions a given user may perform with different resources, documents or other information of the collaboration system 100. The permissions service 110 can be used to manage user access to documents such as various spaces and/or pages. For example, a user may be allowed to create, edit, comment and structure documents associated with their own content space, but only be able to read and comment on documents associated created and/or managed by other users. In some cases, the permissions service 110 gives different permissions to different users. For example, some user may be assigned administrator privileges, which may give them more access to documents, such as the ability to edit, delete, structure/organize, format, or otherwise manipulate documents for other users of the system. In some cases, the permissions service 110 may manage special permission for specific users and/or other services such as the automations engines that allows operations such as updating hierarchical structures of hosted documents, archiving documents, creating templates and so on, which can include broader system side privileges. Additionally or alternatively, the permissions granted to the automation may correspond to those granted to the user, which may help avoid a permissions breach through the automation system.

The content management service 112 can enable clients of the platform to push and/or pull information from the collaboration system. For example, in cases where the collaborations system includes a document management platform, the streaming platform can push documents to the collaboration system and/or pull documents from the collaboration system. In some cases, the streaming platform can allow clients to update (e.g., push or pull) documents in real time. The content management service 112 can be designed to notify client devices of update events such as push or pull operations performed on documents. In some embodiments, the streaming platform 110 can support services such as the permissions service 110, the profiles service 114, the data platform 116, the archiving engine 118 and/or the suggestions engine 120.

The profiles service 114 can include information about users of the collaboration system 100. The profile service 114 can identify a customer, such as an organization that utilizes the collaboration platform 100 and provide the collaboration platform 100 for members of the organization. The profiles service 114 can also include profile information for members of the organization such as usernames, authentication credentials, email addresses, team associations, organizational roles, and so on.

The data platform 116 can enable storing and processing of data that is generated from user interactions with the collaboration system 100. The data platform 116 can continuously collect data from UI layer 102, the collaboration platform API 108, the streaming platform 110, and/or other services or internal and/or external data sources. The data platform 116 enables machine learning on the collected data sets, enables data mining pipelines, or otherwise allows processing of user interaction data with the collaboration system 100. In some embodiments, the data platform 116 may be used to generate recommendations and/or automations that are presented to users interacting with the collaboration system 100 as described herein. In some embodiments, the data platform 116 manage the hierarchical structure of documents hosted by the collaboration system, which can affect how the corresponding graphical objects are displayed. The data platform 116 can also manage archival storage and moving documents between different types of storage. In some cases, there can be multiple levels of storage such as a main level storage for documents that can be directly accessed by the collaboration system, a first level of archival storage, which may allow indirect access of documents, for example, through use of an archival program, or the like, and long-term storage, which may preserve documents for longer periods, but access to these document is harder.

The archiving engine 118 can execute archiving and/or unarchiving actions to documents hosted by the collaboration system 100. The archiving engine 118 may interface with the collaboration platform to update the status of documents such as changing a status of a content item from an active status to an archived status and/or changing from an archived status to an active status. The archiving engine 118 may support moving content items between the active data store 104 and the archived data store 106. In some cases, the active data store 104 may include storage locations and/or storage that is configured to actively load content items onto the collaboration platform 102. For example, the actively loaded content items may include eached components, and/or be readily searched and automatically displayed within a user interface. The archived data store 106 can include storage locations and/or storage that is configured to store archived objects, which may not actively load the content items and/or it's corresponding data onto the collaboration platform 102. For example, the archived data store 106 may be configured as a longer-term storage. For this reason, data stored in the archived data store 106 may reduce the computational overhead of the collaboration platform 102 facilitate more efficient and/or faster operation of the collaboration platform 102.

The suggestions engine 120 can generate recommendations for automations that can be applied to documents, content items, or other digital objects of the collaboration system 100. The suggestions engine 120 can analyze user interactions with the collaboration system, analyze history data such as stored at data platform, or analyze other data to derive automations for recommending to users of the system. The suggestions engine 120 can used event logs, user profiles and/or associated data, contextual data, and/or the like for generating information. For example, the suggestions engine 120 can track how users interact with the system and analyze this data to generate automation rules that can be proposed to users of the system. In some cases, the recommendations may be in the form of a document, such as a template for presenting content at the collaboration system 100. In other cases, the recommendations can automate how documents are searched or displayed such as a page tree, search results, and the like. In some cases, the recommendations can include archiving or moving documents to longer term storage. In other cases, the recommendations can be user-specific automations are based on historical interactions between various users of the system. The suggestions engine 120 can generate these as well as other automations for managing documents hosted by the collaboration system 100 as described herein.

In some cases the suggestions engine 120 can execute recommendations and apply rules to documents hosted by the collaboration system 100. The suggestions engine may interface with the collaboration platform to update, create, archive, or otherwise make changes to documents and/or other content hosted by the collaboration platform. In some cases, the rules may be suggested and accepted by a user, manually input by the user, or otherwise derived by the collaboration system 100 as described herein. The suggestions engine 120 can implement rules in a variety of ways including scheduling rules to execute on documents and/or other content items at defined intervals, under conditions associated with a particular rule, or the like. In some cases, the suggestions engine 118 can execute recommendations to subsets of objects hosted by the collaboration system 100, which may include defined subsets of content items, particular types of content items, content items meeting defined criteria, or the like, as described herein. The suggestions engine 120 can generate recommendation in response to a variety of triggers including user interactions with documents, acceptance of a proposed automation rule, in response to request to create new content items, and so on.

Figure 2:
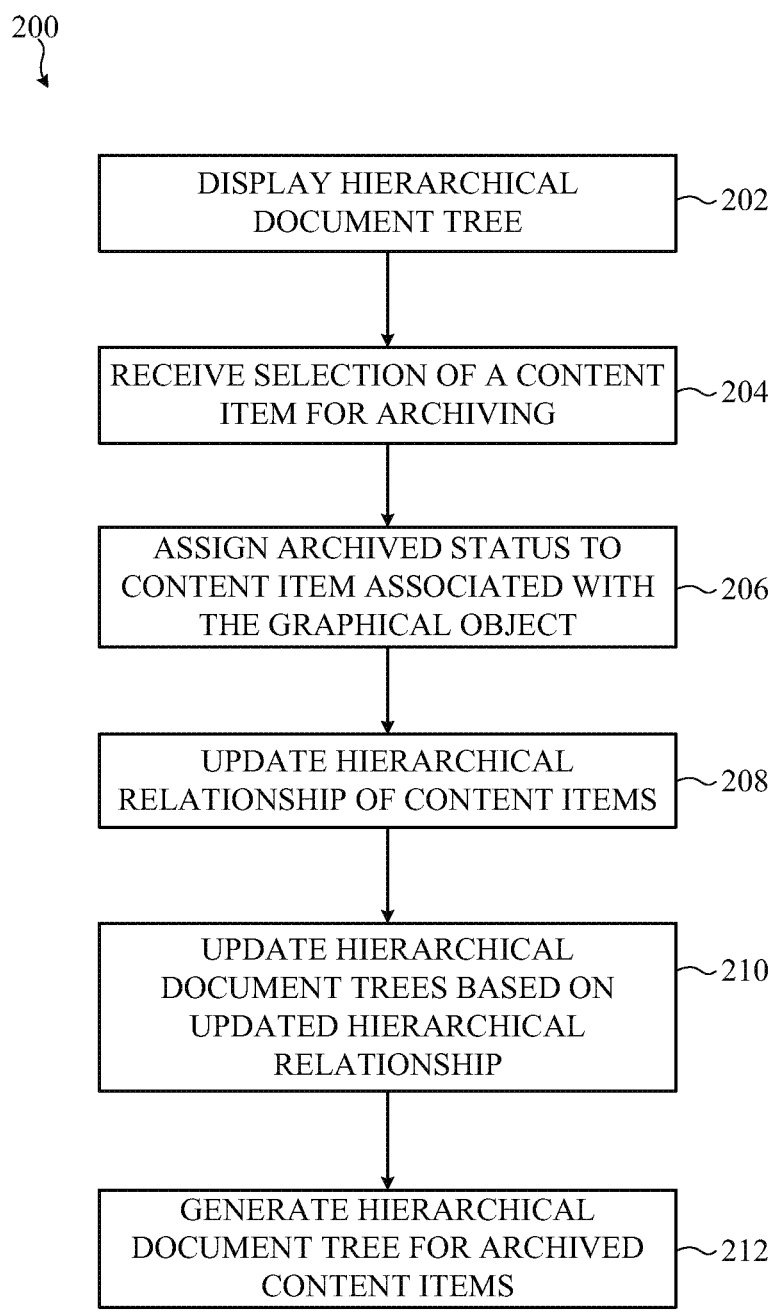
FIG. 2 shows an example process for archiving a content item.

FIG. 2 shows a process 200 for archiving a content item. The process 200 may be performed by a content collaboration system such as the collaboration system 100 described herein.

At operation 202 the process 200 can include displaying a hierarchical document tree in a user interface of the content collaboration system. The content collaboration system can be configured to display graphical objects that represent and/or correspond to content items that are hosted by the system. The content item can have a defined hierarchical structure in which content items can have parent and child dependent relationships with respect to other content items and/or other objects. For example, the content collaboration system may include a root node for each user account associated with the system in which each user can generate and organize content items. The content items displayed in a user's hierarchical document tree can include content items that are generated by the user and/or content items that are generated by other users. In some cases, a user may create additional node that depend from the root node, which can be used to organize and arrange content items according to projects the user is involved in, topics of the content items, teams the user is assigned to and so on. In some cases, content items may be dependent on other content items. For example, a user can create a first content item and create one or more other content items that depend from the first content item.

The ability to view, generate, and/or perform various functions for content items may be permissions based. For example, a user may have a first set of permissions for content items that they create, which can include the ability to modify, edit, delete, archive, share, or perform other actions on the content item. The user may have a second set of permission for other types of content items, which may include content items created by other users. These permissions may be more limited, for example, the ability to view, comment, share, link-to, but not the ability to edit, delete or archive. Some users' roles, such as an administrator, may have more expansive permissions, which can include the ability to edit, delete, archive other user's content items. In some cases, a user's permissions (e.g., administrative user) may be based on their role and/or relation to other users. For example, administrators can be assigned for specific groups, teams, projects, topics and so on.

The content collaboration system can be configured to generated different user interface instances for each user, which can be based on the user's permissions, role or other factors. The content collaboration system can include tools for managing and archiving and/or unarchiving functions (which also may be referred to collectively as "archiving operations") of content items hosted by the system. In some cases, the archiving operations can be activated using various user interface elements such as buttons, selection menus, commands (e.g., input into a command interface), and so on.

The content collaboration interface can cause a first user interface instance to be displayed on a first client device associated with a first user account. The first user interface instance can be based on the user account and/or the associated permissions. For example, the first user interface instance can display a hierarchical document tree that is specific to the first user account. For example, the hierarchical document tree can include graphical representations for content items that are associated with the user through teams, groups, projects, topics, created by the user and so on. Each user may curate their hierarchical document tree, which can include content items that they generated as well as content items generated by other users. Content items included in a user's hierarchical document tree can be updated based on the user's activity as well as activity from other users.

The graphical objects can be arranged according to a hierarchical relationship of the content items. In some cases, the hierarchical relationship can be defined using data objects that include indications of dependencies (e.g., parent child relationships) of the content items. The hierarchical relationship can define a parent node and one or more child node and comprise a branched tree structure. In some cases, this can be implemented using relations tables, pointers, ontological relationships, or any other suitable data structure.

At operation 204 the process 200 can include receiving a selection of a content item for archiving. The selection of the content item can be performed via the user interface and include a user selecting a graphical object displayed in the user interface and that corresponds to the content item. In some cases, the graphical object can be selected through an actions menu, which can be a drop-down menu or other type of menu. In other cases, an archiving mode can be activated and selecting the graphical object can be accomplished by a user clicking on or selecting a visual element associated with the displayed graphical element. The selection of the content item can be used to activate an archiving process for the associated content item.

Selecting content items to be archived may be permissions based. For example, a user who created the content item may have permission to archive the item as this user typically has information of whether the content items are currently relevant, outdated, or associated with a project that is active. Additionally or alternatively, other users such as an administrator may have the ability to archive other user's content items.

At operation 206 the process 200 can include assigning an archived status to the content item associated with the selected graphical object. The change in status can be used to update how the graphical object is viewed by users of the system as well as change how the content items is stored. For example, changing the status of the content item may also include moving the content item from an active data store to an archived data store. In other cases, the content item may be stored in the same way, but the content collaboration system may treat the content item different based on the archive status, such as stopping including the content in search results, displaying the graphical object is some user's feeds, and so on.

At operation 208 the process 200 can include updating the hierarchical relationships of active and/or archived content items based on assigning the archived status to the content item. In some cases, the content collaboration system can update the hierarchical relationships associated with the content item based on a user's role and/or relation to the archived content item.

In some cases, it can be beneficial to allow a user who created the archived content item to be able to view the relationship of the archived content item with respect to the active content items. For example, if the content item was archived by an administrative user, the user who created the content item can see in their hierarchical document tree that the content item has been changed to an archived status. Accordingly, the user may be able to confirm that this was the appropriate action and leave the content item archive or re-active the content item if they believe it is still pertinent. The content collaboration system can generate a first updated hierarchical relationship of the content items for the first user account. The first updated hierarchical relationship of the content items can be based on active content items and archived content items assigned to the first user account. The first updated hierarchical relationship of the content items can indicate the archived status of the content item. Accordingly, the first updated hierarchical relationship of the content items can be used to display a hierarchical document tree that is specific to the first user account and includes archived content items that are associated with the first user in a specific way (e.g., created by, owned by, assigned to, or otherwise associated with the first user).

When a content item is archived, it may be desirable to stop displaying that content item to other users of the collaboration platform. This may increase efficiency of the collaboration platform by reducing the number of actively managed content items, which can decrease loading times, free up memory, speed up search among other advantages. The content collaboration system can generate a second a second updated hierarchical relationship of the content items that excludes the archived content item. In some cases, this can include redefining and/or updating hierarchical relationships for content items or other data structures that depended from the archived content item. For example, the dependent content items can be updated to depend form the next parent node (e.g., the parent object of the archived content item). Accordingly, the second updated hierarchical relationship of the content items can be used to display a hierarchical document tree that is specific to a second user account and does not include the archived content item.

At operation 210 the process 200 can include updating the hierarchical document trees bases on the updated hierarchical relationships. The content collaboration system can construct a first hierarchical document tree instance for displaying the graphical objects for the first user account. The first hierarchical document tree instance can be based on the first updated hierarchical relationship of the content items and include a graphical object that indicates the archived status of the content item. The system can display the first hierarchical document tree instance on the user interface associated with aa first user account. For example, in response to the first client device requesting display of the hierarchical document tree, the system can display in the first user interface instance the first hierarchical document tree instance on the first client device.

In some case, the graphical object for the archive content item may be displayed differently from active graphical objects. Additionally or alternatively, the operations that may be performed on the archived content item may be restricted. For example, users of the system (e.g., first user or administrator) may be able to view the content item, but may not be also to edit, share or perform other actions, which can be configured by the system in response to the archived status of the content item.

The content collaboration system can construct a second hierarchical document tree instance for displaying the graphical objects for a second user account. The second hierarchical document tree instance can be displaying based on the second updated hierarchical relationship of the content items and exclude the archived content item. The system can display the second hierarchical document tree instance on a user interface associated with a second user account. For example, in response to the second client device requesting display of the hierarchical document tree, the system can display in the first user interface instance the first hierarchical document tree instance on the second client device.

At operation 212 the process 200 can include generating a hierarchical document tree for archived content items. In some cases, the content collaboration platform can organize and/or display archived content items based on their hierarchical relationship to other archived content items. In some cases, these archived hierarchical relationships can be derived from the hierarchical relationship of the content items before they were archived. In other cases, the archived hierarchical relationships can be defined by a user of the system, for example upon selecting a content item for archiving, as described herein.

Figure 3:
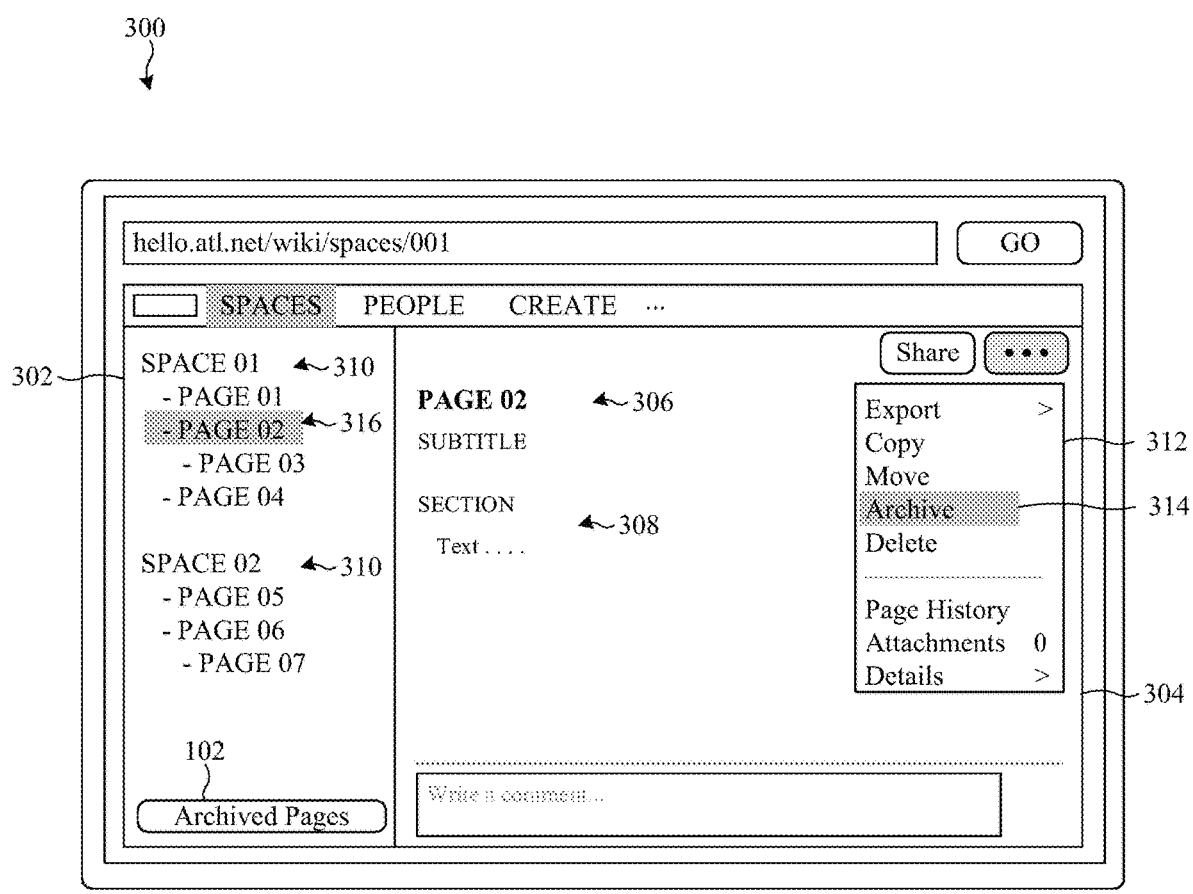
FIG. 3 shows an example user interface for performing archiving operations at a content collaboration system.

FIG. 3 shows an example user interface 300 for a content collaboration system, such as the content collaboration system 100 described herein. The user interface 300 can include one or more regions or panes that are used to display graphical objects and other information to a user and can include various interface elements that can be selected by a user to perform different functions. For example, the user interface 300 can include a navigation pane 302 that displays graphical objects that are associated with documents hosted by the collaboration system. The user interface 300 can also include a content pane 304 that includes content associated with a particular document, content page, or other content, all of which are referred to herein generically as a content item. For example, if a first document is a page, selecting the corresponding graphical object in the navigation pane can result in content associated with the first document being displayed in the content pane 304. In the illustrated example, the content includes a title portion 306 and a text portion 308. Although content items can have a variety of different types of content such as audio, video, animations, pictures, interactive components, and/or the like.

The navigation pane 302 can be organized in a variety of ways. In some cases, as illustrated in FIG. 3, the navigation pane 302 can include hierarchical document tree that displays graphical objects corresponding to content items according to their dependent relationships. For example, a first level hierarchical structure can include a space 310, which may be a collection of related content items. In some cases, the space 310 can include pages (e.g., PAGE 02, PAGE 03, and PAGE 04) that belong to or are otherwise associated with a particular user. In some embodiments one or more spaces 310 can be associated with a group, team, department and/or contain content that is grouped according to similar criteria. Each space 310 can be further organized into sub spaces. For example, a space can include a first sub-space and a second subspace, and each subspace can include references to one or more content items. In other cases, the navigation pane 302 can organize the graphical structures in other ways, which can include additional levels of branching, listing graphical objects according to a common feature, and/or the like. As used herein, the term hierarchical relationship is used to refer to organizational structures that have parent and child relationships such that some documents are grouped under a parent structure. In these cases, the parent documents/categories may be referred to as nodes that have one or more branches indicating dependent relationships to the parent. In some cases, such hierarchical structures can be displayed in a hierarchical document tree an example of which is illustrated in FIG. 3.

In some cases, the navigation pane 302 may display spaces 310 according to a user account. For example, if each user is assigned a space, the navigation pane 302 may show spaces 310 that are assigned to, generated by, or otherwise associated with that particular user account. In other cases, the navigation pane 302 can display spaces 310 based on organizational affiliations, team affiliations, department affiliations, and/or combinations thereof. In some embodiments, the navigation pane 302 can include a search function that can be used to perform text searches and the resulting spaces, sub-spaces pages or other content items can be displayed as part of a search result.

The content pane 304 can include graphical objects that are used to preform various functions. The content pane 304 can display the content of a content item that is selected in the navigation pane 302. For example, if the graphical object for a document page is selected in the navigation pane 302 (e.g., PAGE 02), then the content corresponding to that document page can be displayed in the content pane 304. In some cases, the content pane 304 can include a function menu 312 that can be provides graphical objects that can be used to activate different functions supported by the collaboration system. The function menu 312 may include a graphical object 314 for activating an archiving function for a content item selected in the navigation pane 302 and being displayed in the content pane 304. Selecting the graphical object 314 can result in the content item being assigned an archived status and/or moved to archived storage as described herein. In the example shown in FIG. 3, a first content item 316 (e.g., PAGE 02) is selected for archiving, which can be performed as described herein.

Figure 4A:
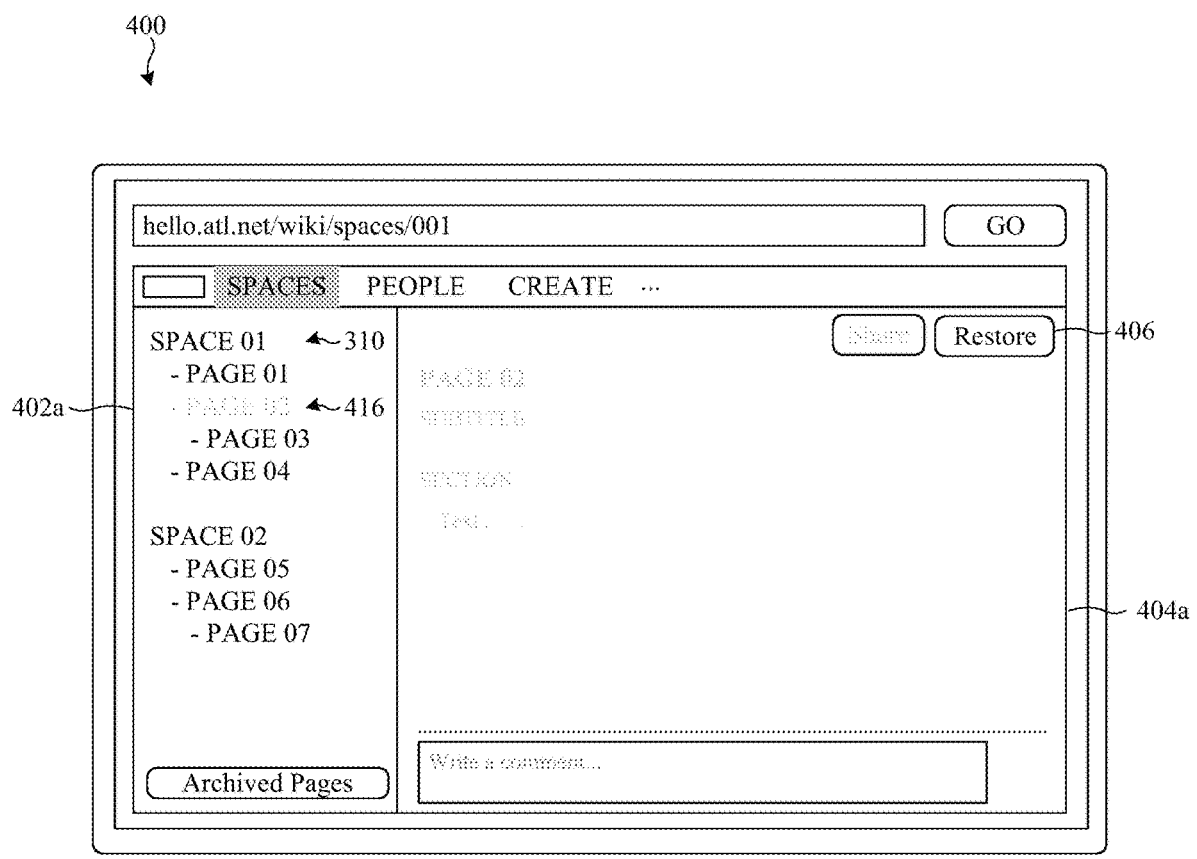
FIGS. 4A-4B show example user interfaces for viewing content items in a hierarchical document tree format a content collaboration system.
Figure 4B:
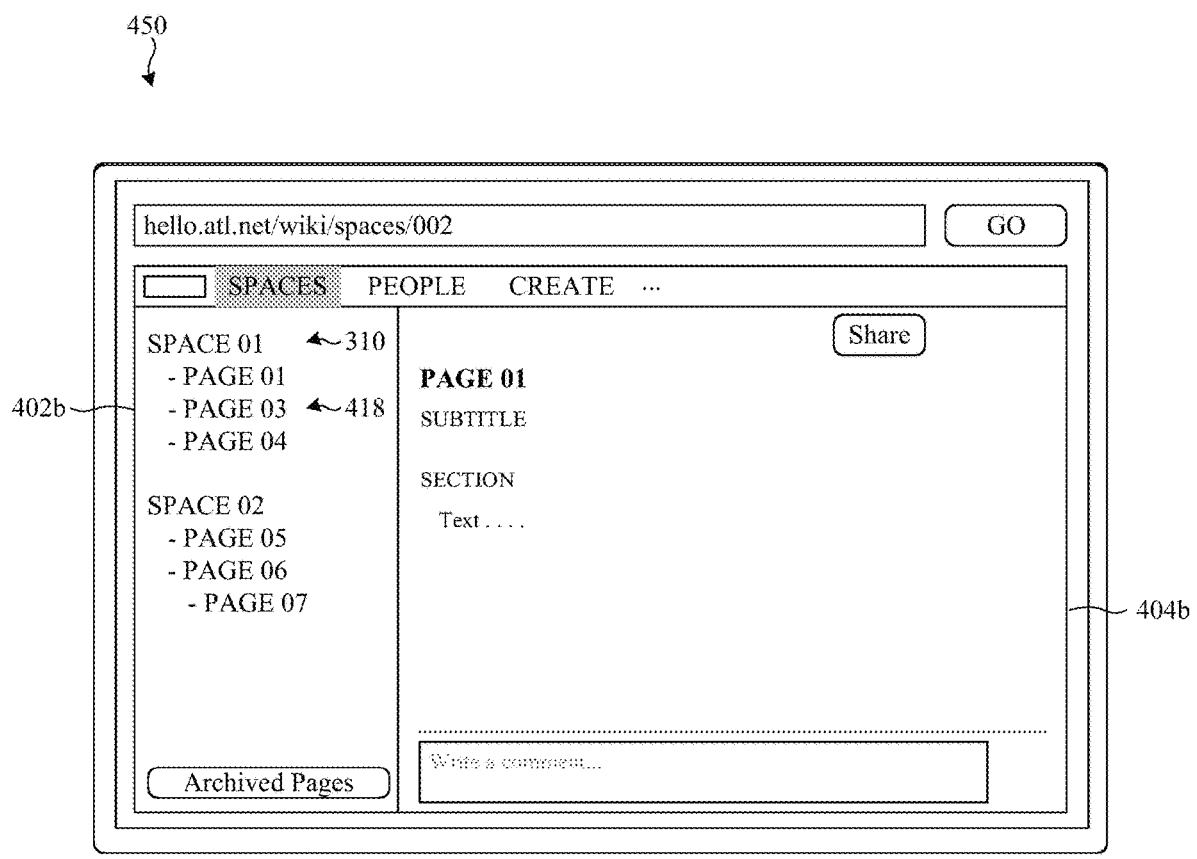

FIGS. 4A and 4B show example user interfaces 400, 450 that are generated in response to content item 316 being archived. The user interfaces 400, 450 can include a navigation pane 402 and a content pane 404 as described herein.

The user interface 400 shown in FIG. 4A can be an example of a first user interface instance that is generated for a first user account that has a first set of relations/permissions with respect to the first content item. For example, the user interface 400 can be generated for a creator, owner, and/or administrator of the first content item 316. The navigation pane 402a can display a hierarchical document tree that includes graphical objects (e.g., SPACE 01, PAGE 01, PAGE 02 and so on) arranged according to a hierarchical relationship of the content items. For example, SPACE 01 may be a parent node to PAGE 01-PAGE 04 and PAGE 03 may depend from PAGE 02. The hierarchical document tree can show these dependent relationships in a variety of ways. In the example shown, the dependent relationships are shown by indenting the dependent content items with respect to a parent node. In other cases, fonts, colors, graphics, or any other suitable techniques can be used to illustrate the hierarchy of the content items.

As described herein the first user interface 400 may be a user interface instance that is generated for a user with higher-level permissions such as creator, owner or administrator. Accordingly, the first user interface 400 can include a graphical object 416 for the first content item 316. The graphical object 416 may be displayed differently due to the archived status of the first content item 316.

Additionally or alternatively, one or more functions of the first content item 316 may be restricted or limited due to the archived status. For example, the first user may be able to view content of the first content item in the content pane 404b, however the first user may no longer be able to edit, share or perform other actions. In some cases, the user interface 400 can include a graphical element 406 for restoring the first content item 316. For example, in response to a selection of the graphical element 406, the collaboration system may change a status of the first content item 316 from an archived status to an active status and/or move the first content item from an archived data store and to an active data store.

The user interface 450 shown in FIG. 4B can be an example of a second user interface instance that is generated for a second user account that has a second set of relations/permissions with respect to the second content item. The user interface 450 can be generated for a second user account that has a more restricted set of permissions with respect to the first content item 316. For example, the second user account may be a user that the first content item was shared with. As described herein, a second hierarchical document tree may be displayed in the second user interface instance and exclude the first content item 316 based on the archived status. Additionally or alternatively, the hierarchical document tree can be updated to show the updated hierarchical structure of the content items based on the first content item 316 being assigned an archived status. In this example, a second graphical object 418 corresponding to a second content item (PAGE 03) that was dependent from the first content item (PAGE 02) has been updated to reflect that the second content item directly depends from SPACE 01.

Figure 5:
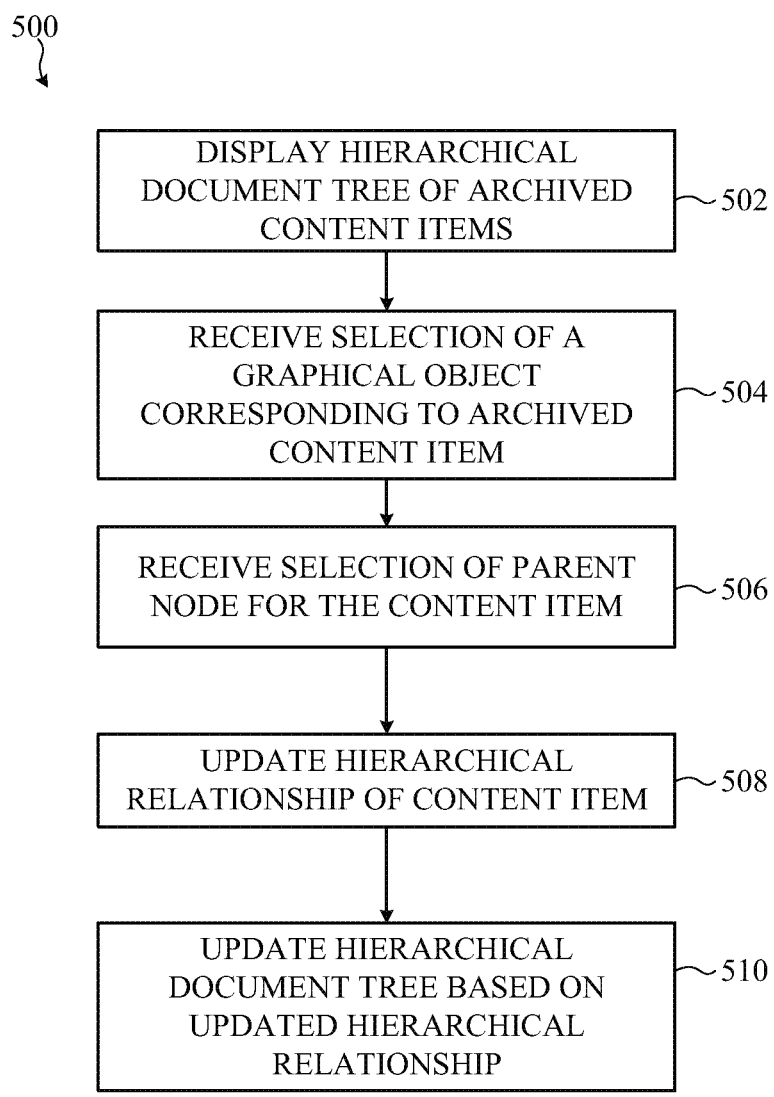
FIG. 5 shows a process for changing a content item from an archived status to an active status.

FIG. 5 shows a process 500 for changing a content item from an archived status to an active status. The process 500 can be performed by the content collaboration systems described herein such as content collaboration system 100.

At 502, the process 500 can include displaying a hierarchical document tree of archived content items. The hierarchical document tree can include graphical objects that are arranged according to a hierarchical relationship of archived content items. For example, as content items are archived, they can be assigned a hierarchical relationship with respect to other archived content items. In some cases, the hierarchical relationships of the archived content items can be based on a hierarchical relationship of the content items when they had an active status. For example, if before two content items were archived, they had a parent child hierarchical relationship, then after they were archived, that same parent child hierarchical status can be preserved in the archived state. In other cases, a new hierarchical relationship can be defined in response to the content items being assigned an archived status. For example, if a content item being archived doesn't have a defined hierarchical relationship to other archived content items, the content collaborations system may define a new base node and assign the archived content item to that base node. In cases, where multiple related content items are being archived at the same time, the base node may serve as a primary node and the hierarchy of the multiple archived content items may be preserved from the base node.

At 504, the process 500 can include receiving a selection of a graphical object corresponding to an archived content item. The selection of the archived content item can be performed via the user interface and include a user selecting a graphical object displayed in the user interface and that corresponds to the archived content item. In some cases, the graphical object can be selected through an actions menu, which can be a drop-down menu or other type of menu. In other cases, an unarchiving mode can be activated and selecting the graphical object can be accomplished by a user clicking on or selecting a visual element associated with the displayed graphical element. The selection of the content item can be used to activate an unarchiving process for the associated content item. The unarchiving process can result in the status of the content item being changed from an archived status to an active status and/or moving the content item from an archived data store and to an active data store.

The content collaboration system can receive a request to change the archived status of the content item to unarchived status in response to a user selecting the graphical object associated with the archived content item. In response to receiving the request to change the archived status of the content item to the unarchived status the content collaboration system can assign an active status to the content item.

Selecting content items to be unarchived may be permissions based. For example, a user who created the content item may have permission to unarchive the content item as this user typically has information of whether the content items are currently relevant, outdated, or associated with a project that is active. Additionally or alternatively, other users such as an administrator may have the ability to unarchive other user's content items.

At 506, the process 500 can include identifying a parent node for the content item that is being unarchived. For example, the content collaboration system can present one or more graphical objects that allow a user to select an active content item or object (e.g., base node) as a parent node that the content item will be assigned to when it is unarchived. In other cases, the content collaboration system can determine a parent node for the content item based on an archived hierarchical relationship of the content item and/or a hierarchical relationship of the content item prior to being archived.

At 508, the process 500 can include updating the hierarchical relationship of the content item with respect to other active content items. In some cases, updating the hierarchical relationship of the content item can include a hierarchical relationship of the based on the defined parent node. Accordingly, in response to the change to the active status, the relationship of the content with respect to other active content items can be determined.

At 510, the process 500 can include updating the hierarchical document tree based on the updated hierarchical relationship for the unarchived content item. This can include constructing an updated hierarchical document tree instance for displaying the graphical objects for each user account. Accordingly, in response to one or more client devices requesting display of the hierarchical document tree, the content collaboration system can display the updated hierarchical document tree instance in a user interface of the one or more client devices.

Figure 6:
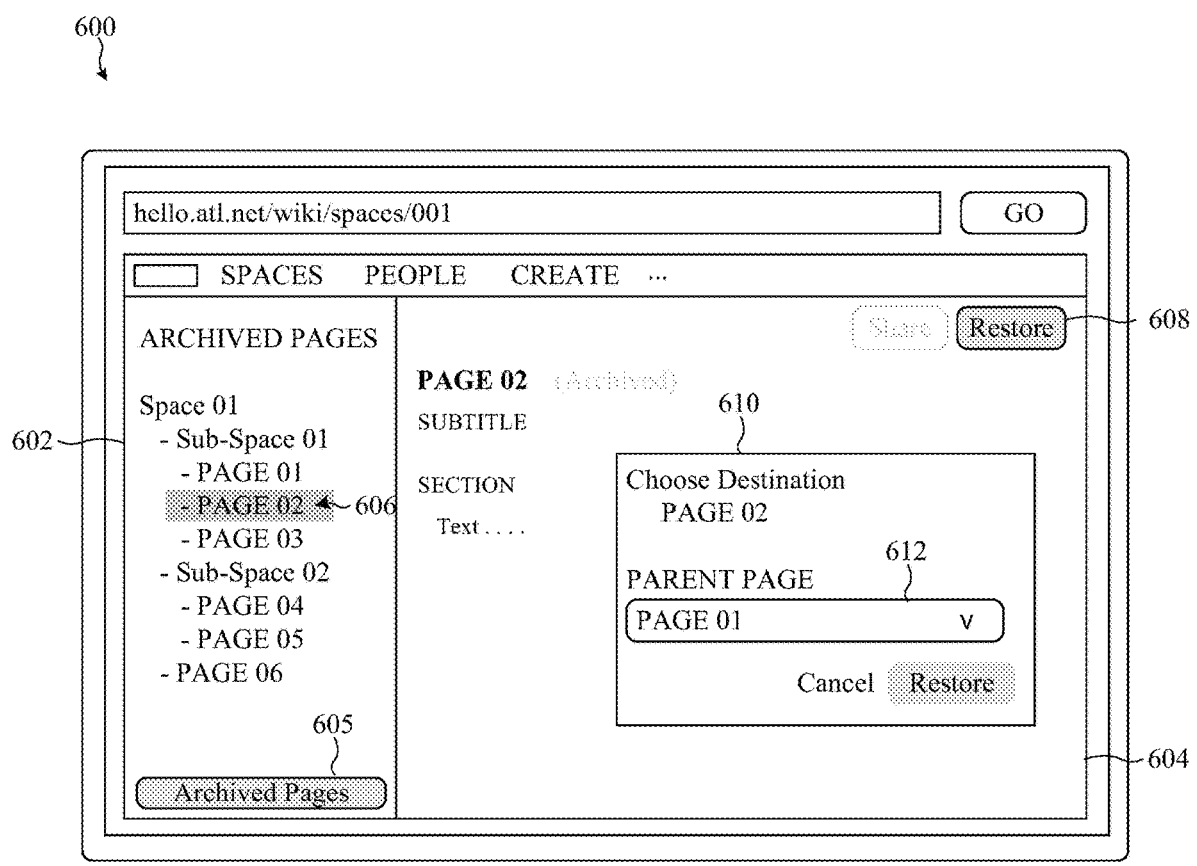
FIG. 6 shows an example user interface for changing a content item from an archived status to an active status.

FIG. 6 shows an example user interface 600 for unarchiving content items. The user interface 600 can include a navigation pane 602 and a content pane 604, which can be examples of the navigation and content panes described herein.

In some case, the user interface 600 can include an option to view archived pages that are hosted by the content collaboration system. For example, the user interface 600 can include a selectable element 605 that displays archived pages. In some cases, the archived pages can be displayed in the navigation pane 602 and be displayed in a hierarchical document tree format based on the hierarchical relationship of the archived pages as described herein. A user may select an archived page 606 (e.g., PAGE 02) from the navigation pane 602 and the content associated with the archived page 606 can be displayed in the content pane 604 as described herein. In some cases, the actions that can be taken on the archived page 606 may be limited, for example, as compared to active pages. For example, a user may view, comment on or perform other types of actions with respect to the archived page 606, but may be prevented from editing the archived page 606 or making other types of changes to the archived page 606.

In some cases, the content pane 604 can include an option 608 to restore the archived page 606. In response to selecting the option 608, the status of the archived page may be changed to an active status and/or the archived page 606 may be move to an active data store. Additionally or alternatively, the content collaboration system may generate a graphical object that is displayed in the hierarchical document tree along with the graphical objects for other active content items. The hierarchical structure of the archived data object can be updated in response to unarchiving the content item 606. In some cases, the hierarchical structure of the content item 606 can be updated to based on a hierarchical data structure of the content item prior to archiving. For example, if the content item 606 depends from a first content item and had one or more other content items that were dependent from it, then the hierarchical relationships of these content items can be updated to restore these relationships. Accordingly, upon unarchiving, the content item 606 may be displayed in a hierarchical document tree in the same or similar relation as prior to it being archived.

In other cases, the content collaboration system may include a hierarchical assignment tool 612, which can allow a user to define one or more hierarchical relationships to the content item as it is moved to an active content item. For example, the assignment tool 612 can include an option to assign the parent page of the content item 606. Accordingly, a user may be able to define a different hierarchical relationship for the content item than it had before being archived.

Figure 7:
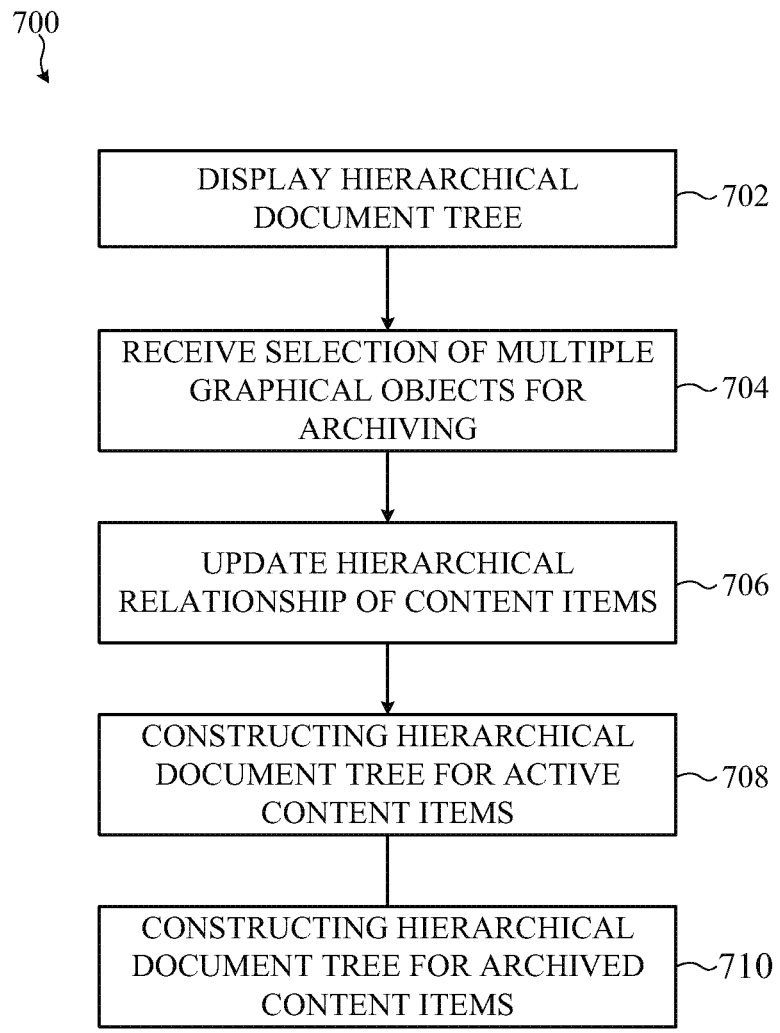
FIG. 7 shows an example process for archiving multiple content items.

FIG. 7 shows an example process 700 for archiving multiple content items. The process 700 can be performed by the content collaboration systems described herein such as content collaboration system 100.

At 702, the process 700 can include displaying a hierarchical document tree in a user interface of the content collaboration system. The hierarchical document tree can be an example of the hierarchical documents trees described herein and display graphical objects for content items hosted by the content collaboration system. The hierarchical document tree can display the content items based on the hierarchical relationship of the content items.

Figure 8A:
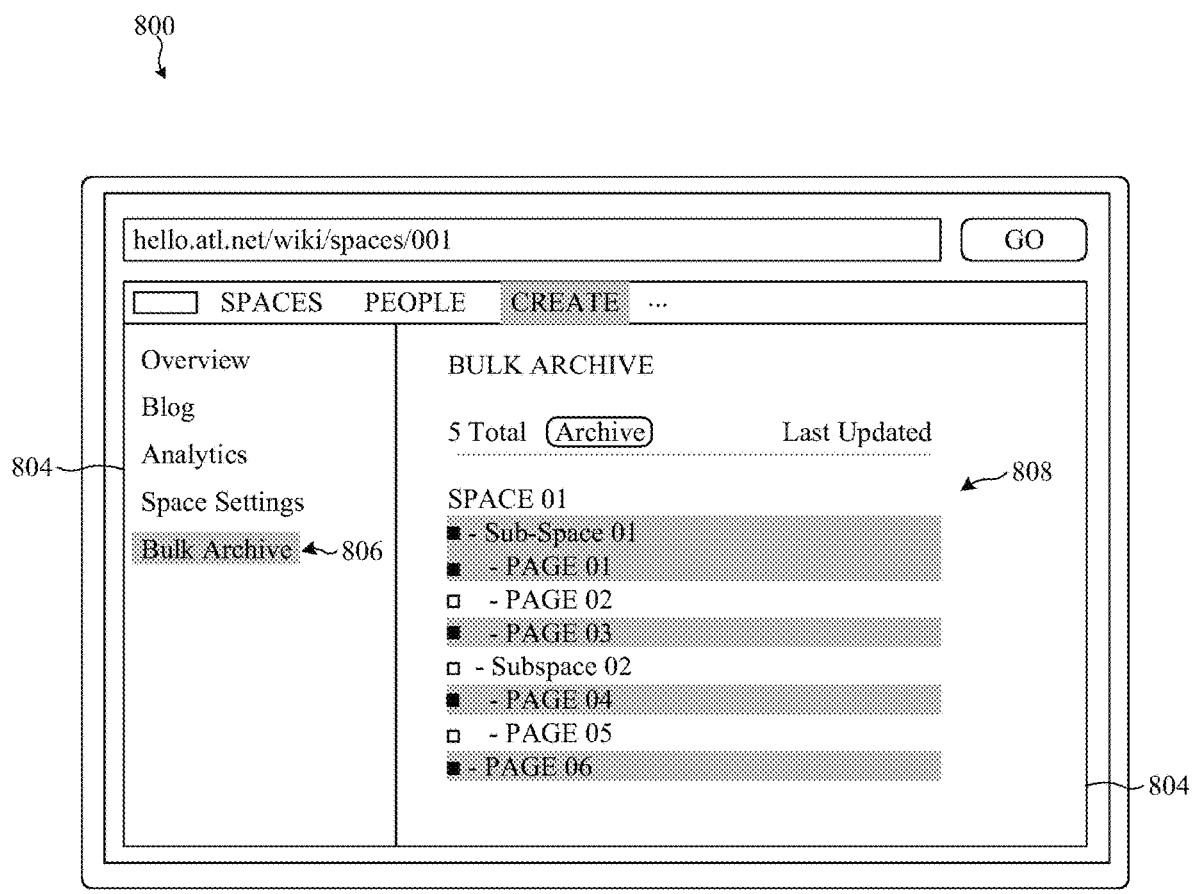
FIGS. 8A-8C show example user interfaces for archiving multiple content items and view archived content items.

At 704, the process 700 can include receiving a selection of multiple graphical objects for archiving. In some cases, the user interface can include an option for selecting one or more content items for archiving. For example, the content collaboration system may allow a user to select various graphical objects from the hierarchical document. A user may be able to select multiple graphical objects that have different hierarchical relationship and may or may not be related to each other as shown in FIG. 8A.

This multiple selection function may also be permissions based. For example, a user may view all or a portion of the content items that are owned by them and select various ones for archiving. In other cases, a user with permission to modify/archive other user's content items, such as an administrative user, may view a group of content items from multiple users and select various one for archiving. For example, the administrative user may view content items associated with a group, team, project and so on. This can allow a user to see all, or a portion of the content items associated with a group and their hierarchical relationship and select which content items will be archived.

At 706, the process 700 can include updating the hierarchical relationship of the content items based on the content items selected for archiving. In some cases, if a parent content item is selected for archiving, then the children content items can be assigned to the next hierarchy level up from the parent. If the parent content item is the highest node level for a group of content items, then the content collaboration system may define a parent node object and assign the children content items to this new node. In other cases, the content collaboration system may allow a user to select and/or otherwise assign a hierarchy to the unarchived content items. In some cases, multiple content items may be selected that have different parent objects, or have independent hierarchical relationships. For each archived content item, the content collaboration system may determine an updated hierarchical relationship such as identifying or defining a new parent node.

At 708, the process 700 can include constructing a hierarchical document tree for the active content items based on the content items that were selected for archiving. For example, the hierarchical document tree may remove the graphical objects for the content items selected for archiving and display the graphical objects for the remaining content items according to their updated hierarchical relationships.

At 710, the process 700 can include constructing a hierarchical document tree for the archived content items based on a hierarchical relationship of the content items selected for archiving. In some case, the hierarchical relationship of the archived content items can be based on their hierarchical relationship prior to being selected for archiving. For example, if a patent content item and one or more of its children were selected for archiving, this parent-child hierarchical relationship can be preserved when the content items are archived. Accordingly, the hierarchical document tree for archived content items can display a hierarchical relationship of these content items.

FIG. 8A shows an example user interface 800 for archiving multiple content items. The user interface 800 can include a navigation pane 802 and a content pane 804, which can be examples of the navigation and content panes described herein.

In some cases, the navigation pane 804 can include an interface element 806 for activating a bulk archiving tool. In response to selecting the interface element 806, the bulk archiving tool can be displayed in the content pane 804. The bulk archiving tool can display a hierarchical document tree 808 showing graphical objects corresponding to content items hosted by the content collaboration system. The graphical objects may be arranged according to a hierarchical relationship of content items. For example, as shown in FIG. 8A, the "SPACE 01" may be a base node for the displayed graphical objects and include multiple levels of hierarchal relationships, which can include sub-spaces (e.g., Sub-Space 01, Sub-Space 02, and so on), which can have one or more children graphical objects corresponding to content items, or additional objects (e.g., additional dependent sub-spaces).

The bulk archiving tool can allow a user to select one or more of the content items or other objects (e.g., sub-space) for archiving. For example, as illustrated in FIG. 8A, Sub-Space 01, PAGE 01, PAGE 03, PAGE 4 and PAGE 6 are selected for archiving. In response to these selections, the content collaboration system can change to selected content items to an archived status and perform one or more steps to archive these content items, as described herein (e.g., in relation to FIG. 7).

Figure 8B:
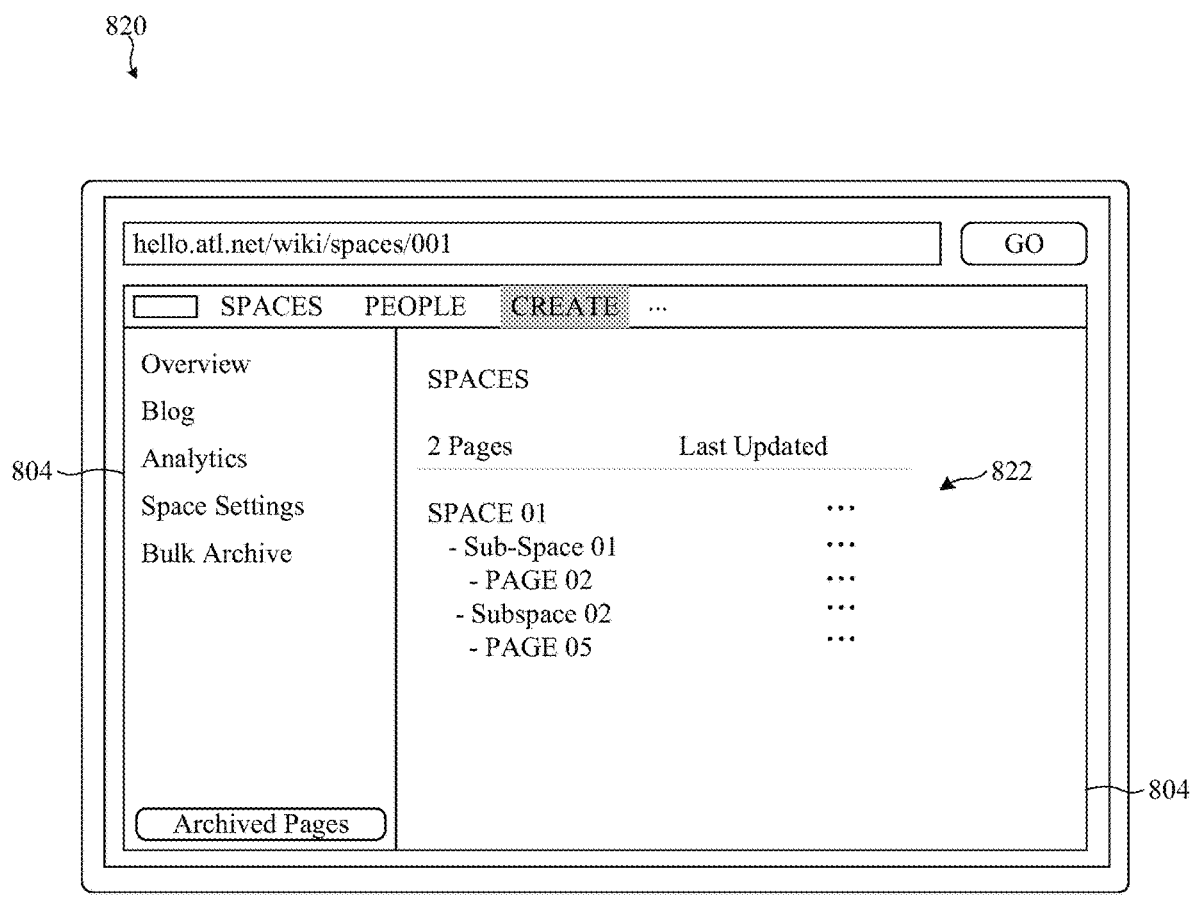

FIG. 8B shows an example user interface 820 displaying an updated hierarchical document tree 822 for active content items based on the content items selected for archiving in FIG. 8A. As described herein, the hierarchical relationship of the active content items can be updated based on the content items that are assigned an archived status. For example, in FIG. 8A, Sub-Space 01, PAGE 01, PAGE 03, PAGE 4 and PAGE 6 were selected, and as a result, assigned an archived status. Accordingly, the graphical objects for the remaining active content items are displayed in the updated hierarchical document tree 822. The updated hierarchical document tree can be formatted to indicate the change in the hierarchical relationship of the active content items as described herein.

Figure 8C:
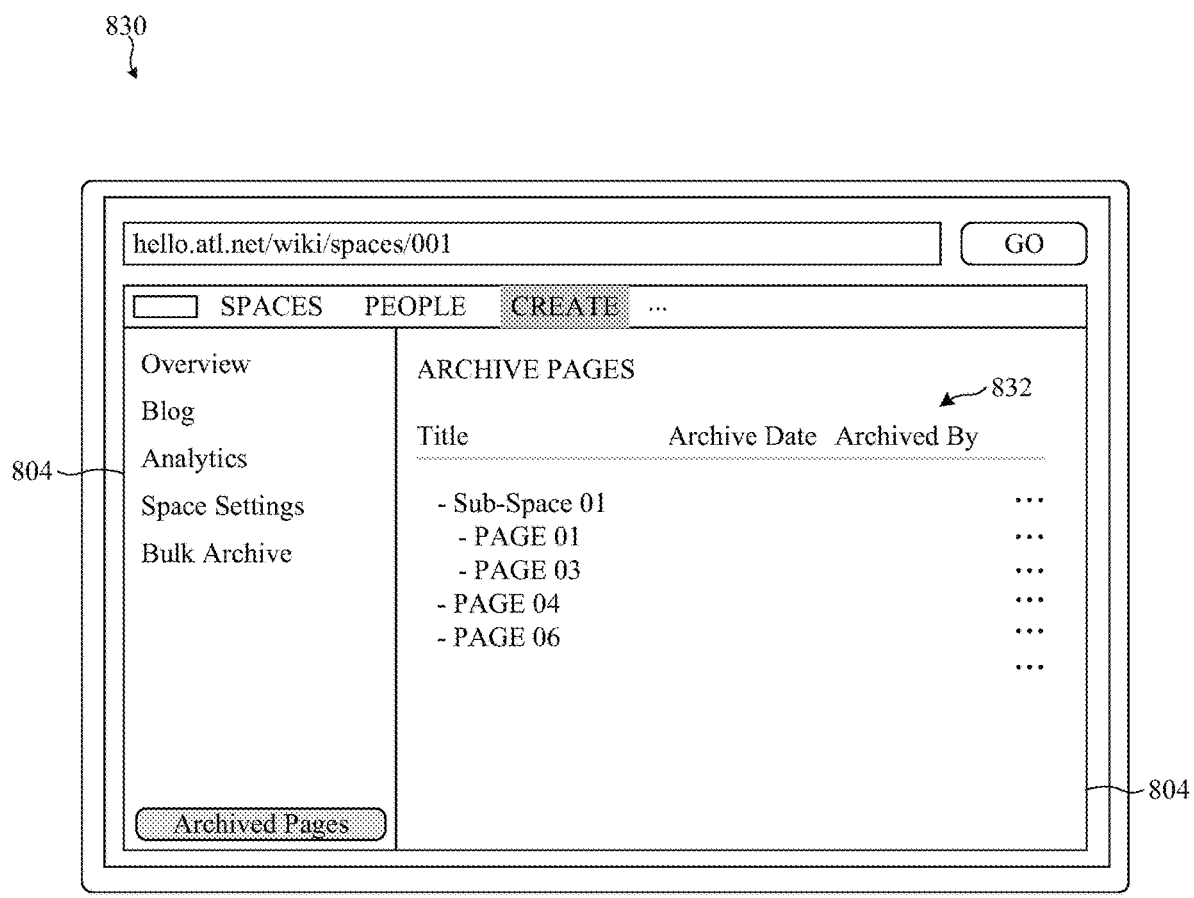

FIG. 8C shows an example user interface 830 displaying an archived hierarchical document tree 832 for the archived content items based on the hierarchical relationship of the archived content items. The archived hierarchical document tree 832 can include graphical objects for the archived content items (e.g., Sub-Space 01, PAGE 01, PAGE 03 and so on). The archived hierarchical document tree 832 can display the graphical objects according to the hierarchical relationship of the archived content items. In the example shown in FIG. 8C, the graphical objects are arranged according to the hierarchical relationship of the content items when they are assigned an active status. For example, the hierarchical dependency of the content items was preserved when they were assigned an archived status. In other cases, the content collaboration system can change the hierarchical relationships of the content items and/or allow a user to define a different hierarchical structure, which would be represented in the archived hierarchical document tree 832.

Figure 9:
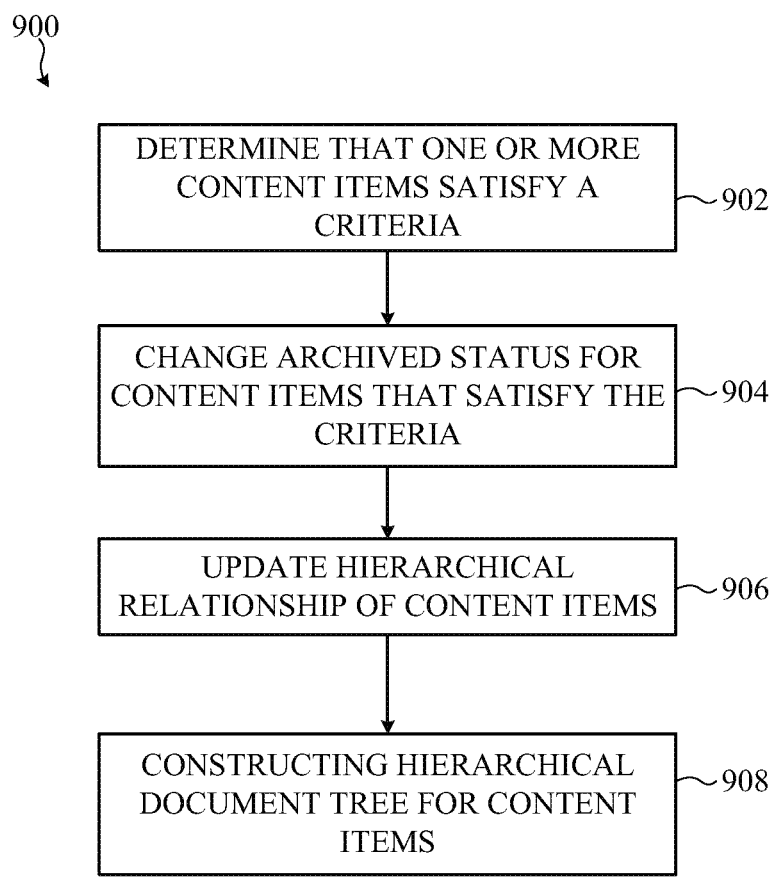
FIG. 9 show an example process for identifying content items for archiving or unarchiving.

FIG. 9 shows an example process 900 for identifying content items for archiving or unarchiving. The process 900 can be performed by the content collaboration systems described herein, such as content collaboration system 100.

At operation 902, the process 900 can include determining that a content item satisfies a criteria. In some cases, the criteria can be based on how often a content item is viewed or the last time that a content item was accessed. For example, criteria for an active page can include the last time the page was viewed, the age of the page (e.g., how long ago was it created), the last time a page was updated, how many times a page has been accessed, or other suitable metrics or combinations thereof. In some cases, the criteria can be defined to initiate an archiving operation if it is satisfied. For example, the criteria can include a defined value for the last time a content items was viewed, the age of the content item, how long ago it was accessed, and content items that have values equal to or above one or more of these values may be recommended for archiving.

In some cases, the criteria can be defined from moving a content item from archived storage to active storage (e.g., a restoring a content item). For example, the criteria can include a number of times a content item was viewed while in archived storage, whether and/or how often a content item was searched for (e.g., using a search function), whether and/or how often an archived content item was liked commented on other otherwise interacted with. In other cases, the criteria can include a relationship of the content item to other content items. For example, if a parent content item was selected for archiving the criteria can include identifying any dependent archived content items to the selected parent. Using this criteria, the content collaboration system may suggest unarchiving related content items also such a child content item.

In some cases, the criteria can be based on an integration of a content item with other content items of the system. For example, a content item may include links to other content items or objects of the system and/or the content item may be linked to by other content items or external sources. Accordingly, archiving the content item may result in one or more of these links being broken. For this reason, the criteria may be based on a number of links to the content item and/or a number of links from the content item. For example, if the content item has more than a defined number of incoming links, the criteria may not be satisfied because archiving the content item may break more links than desirable. In other cases, a content item may be whitelisted, which may prevent the content item from being archived as long as it has a whitelisted status. For example, the whitelisted status may be applied to content items that are deemed important, but rarely change and/or are also infrequently accessed.

In some cases, the content collaboration system can include a machine learning system that is trained based on a user's interaction with content items and makes recommendations to archive or unarchive content items based on these interactions. For example, all the content items relating to a specific project may be archived in response to that project be placed on hold. If the project is revived and/or a similar project is started, the machine learning model may be trained to identify the archived content items related to the revived project and/or similar project and recommend that one or more of the content items be assigned an active status.

At operation 904, the process 900 can include changing the archived status for the content items that satisfy the criteria. For content items that are assigned an active status and satisfy a criteria (e.g., exceeding a defined age), the status of these content items can be changed to an archived status. Similarly, for content items that are assigned an archived status and satisfy a criteria (e.g., exceeding a defined number of page views), the status of these content items can be changed to an active status. In some cases, prior to changing the status of the content items or in response to changing the status of the content items, the system can prompt a user to confirm and/or accept the change in status. The system may prompt a user based on their permissions and/or a defined relationship to the content item(s). For example, the collaboration system can prompt an owner and/or administrator of the content item to approve archiving or restoration of a content item. In some cases, the collaboration system may be configured to prompt a first user for an archiving decision and a different user for an unarchiving decision.

At operation 906, the process 900 can include updating the hierarchical relationship of content items based on content items that are selected for archiving or unarchiving. The hierarchical relationships can be updated as described herein. For example, if a content item is selected to be archived, then the hierarchical relationship of that content item with respect to other archived content items can be based on the hierarchical relationship of the content item prior to archiving. This can preserve the hierarchical relationships of the content items as they are either archived or unarchived. In other cases, a user of the system can define their hierarchical relationship of the content items as they are either archived or unarchived as described herein.

At operation 908, the process 900 can include constructing a hierarchical document tree for content items based on their hierarchical relationship. The hierarchical document tress can be generated and displayed as described herein and include graphical objects that are arranged according to the hierarchical structure.

Figure 10:
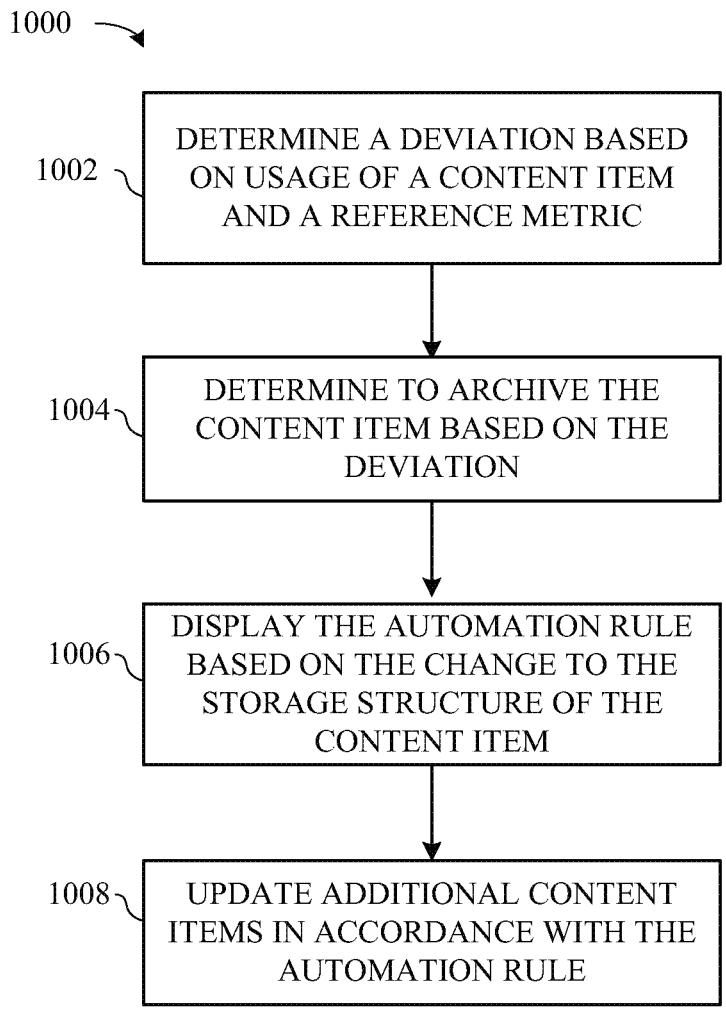
FIG. 10. shows an example process for generating an automation rule for archiving content items.

FIG. 10 shows an example process 1000 for generating an automation rule for archiving documents. The process may be performed by a content collaboration system such as the collaboration system 100 described herein.

At operation 1002 the process 1000 can include determining a deviation based on usage of content items and a reference metric. In some cases, this can include determining how often content items are accessed. In this regard, the access metric may be determined for content items that correspond to the displayed graphical objects. The usage can be determined in a variety of ways and indicate access properties associated with a graphical object (and the corresponding content item), such as how many times the content item has been accessed, how often the content item is accessed, log information related to accesses such as time, date, user id associated with device/program that accessed the content item and so on. The reference metric can be a parameter such as a value that is used to determine whether archive the content item and/or display parameters of the corresponding graphical object. For example, a reference metric can be defined to identify a content item that infrequently accessed (e.g., have low number of total accesses, haven't been accessed for a defined period of time). In this regard if a deviation between the usage of the content item and the reference metric satisfies a criteria, then the content collaboration system can archive the content item and/or stop displaying the corresponding graphical object.

In some cases, the reference metric can be an access count the identifies the number of times a content item has been accessed. The reference metric can be a defined access count, that specifies a minimum number of accesses for maintaining a current storage structure of the content item. In this regard, the criteria may be set to identify content items that have an access count lower than the defined metric. In other cases, the access metric can include a variety of different parameters such as an access frequency, last access date, and so on.

At step 1004, the process 1000 can include determining to archive the content item in response to the deviation metric satisfying a threshold. This can include determining that a document should be move to intermediate storage, moved to long term storage or otherwise migrated to new storage location. In some cases, the change can be to the graphical object corresponding to the content item. For example, the collaboration system can maintain a current storage structure of the content item, but stop displaying the corresponding graphical object.

At step 1006, the process 1000 can include displaying the automation rule for the user to review prior to applying the automation to the content items, as described herein. In some cases, displaying the automation rule can include determining an automation rule based on the determination to archive the content item. The recommendation engine can include a machine learning component that can operate to identify potential rules based on analyzing historical data associated with the collaboration system and/or current user interaction data to identify and a generate an automation rule for managing content items hosted by the collaboration system. The automation rule can be applied to content items created by the user and/or can be applied to other content items created/owned by other users of the collaboration system. For example, upon generating and executing an automation rule for a first user, the collaboration system can suggest the automation rule be applied to other content items. This can include presenting the automation rule to other user who have content items that meet the rule conditions and/or higher-level users of the collaboration system such as an administrator. Accordingly, automation rules can be generated in the context of analyzing interactions of one or more individual users and applied to a larger set of content items hosted by the system.

Displaying the automation rule can include displaying the deviation based on comparing usage of the content item and the reference metric. The automation rule can also include a criteria for applying the automation rule to one or more additional content items hosted by the content collaboration system, such as content items that are not currently being displayed.

Displaying the automation rule can also include displaying one or more user interface elements for performing actions associated with the automation rule. This can include displaying a user interface element for accepting the automation rule, and a user interface element for modifying the automation rule. In some cases, the collaboration system can also display an option to decline the automation rule in the UI.

In some cases, the collaboration system can show a preview of the changes that would occur as a result of implementing the rule. For example, the collaboration system can generate a new window or pane that would show changes to the navigation pane or other interface elements if the automation rule was accepted, such as the removal of some of the content items from the display. Additionally or alternatively the collaboration system can display user interface elements that allow a user to accept or decline the automation rule in response to viewing the effect. In this regard, the preview may help a user to further understand the effect of the automation rule prior to it taking effect.

Figure 11:
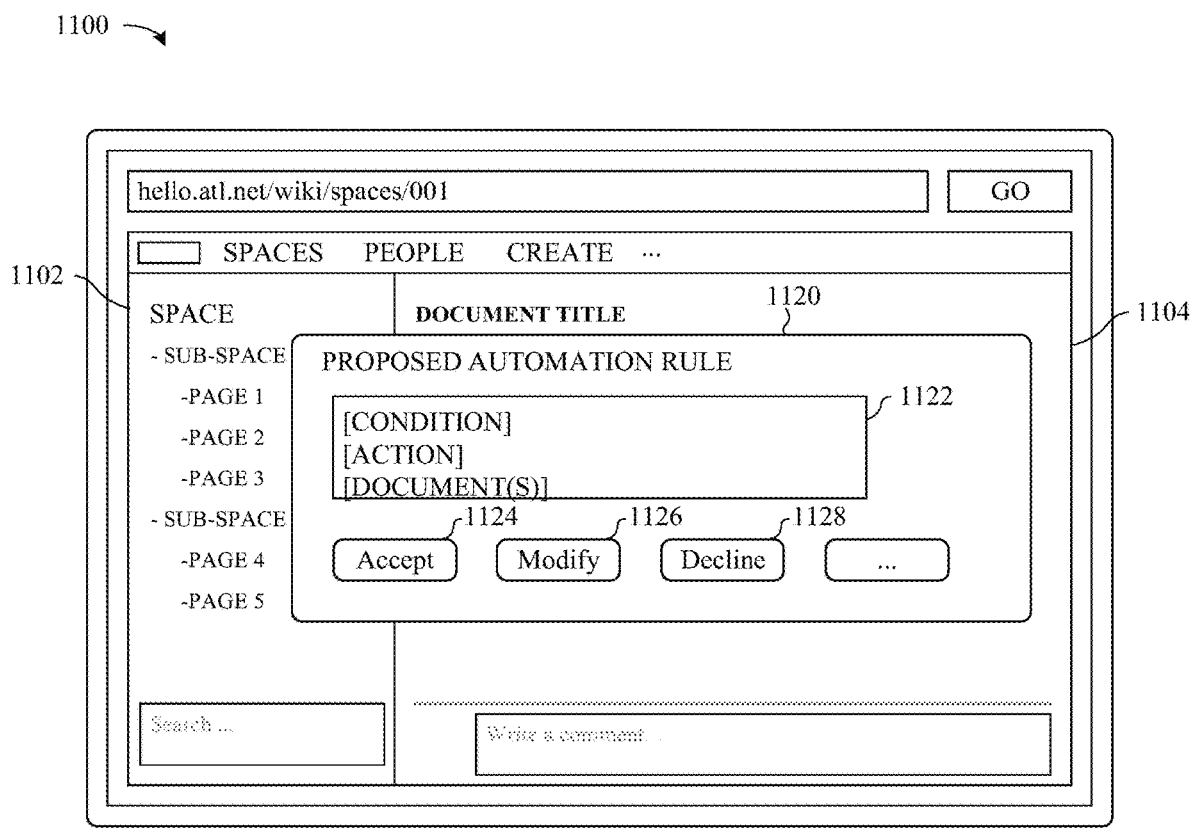
FIG. 11 shows an example of an automation editor that can be used to generate an automation rule for documents hosted by the collaboration system.

At step 1008 the process 1000 can include executing the automation rule to update content items in accordance with the automation rule. In some cases, this can be in response to a user selecting a user interface element that accepts the automation rule. In other cases, the automation rule can be applied automatically. Applying the automation rule can result in the UI of the collaboration system being updated to reflect changes to the content items. For example, if one or more content items being displayed are archived then the UI layer can update the navigation menu to remove these content items from the displayed. Additionally or alternatively, the collaboration platform can update additional content items such as metadata, index data, or the like to update the organizational structure associated with these content items. Accordingly, after the update to the organizational structure of the content items change to how the graphical objects corresponding to the content items are displayed FIG. 11 shows an example of an automation editor 1120 that can be used to generate an automation rule for content items hosted by the collaboration system. The automation editor 1120 can be launched in response to determining a change to the hierarchical structure of one or more graphical objects as described herein. This can include changing the nodal structure that is used to organize the graphical objects in the user interface, archiving content items, removing content items, displaying content items in different subspaces and so on. Based on the determined change, the collaboration system can generate an automation rule that can be applied to other content items of the system. In other cases, the automation editor 1120 can be launched based on a scheduled or in response to other triggers such as being manually launched by a user.

The automation editor 1120 can include a rule explanation field 1122, a first user interface element 1124 for accepting the rule (e.g., accept button), a second user interface element 1126 for modifying the rule (e.g., Modify button) and a third user interface element 1128 for declining the rule (e.g., decline button). In some embodiments the rule explanation field 1122 can include a natural language explanation of the rule, which can include the conditions that trigger application of the rule and the actions that occur as a result. Additionally or alternatively, the rule explanation field 1122 can include pseudocode which can include Boolean operators, logical operators, arithmetic operators, and/or the like.

In response to a user selecting the first user interface element 1124, the collaboration system can execute the automation rule on the respective content items, which can include content items meeting the defined conditions for applying the automation rule. For example, if the automation rule is to archive documents that have an access count that do not meet a defined threshold, then the collaboration system can archive documents that meet this criteria and stop showing them in the navigation pane 1102 or other panes of the user interface 1100. Such processes can reduce the number of items displayed to a user thereby improving performance of the collaboration system.

In response to the user selecting the second user interface element 1126, the system can launch an editing interface. In response to the user selecting the third user interface element 1128 for declining the rule, the automation editor 1120 can close without implementing the proposed automation rule. In some cases, the collaboration system can track whether a user declines an automation rule, and use this tracked information to modify the rule and/or determine whether to propose similar automation rules in the future. For example, if similar or the same automation rule is proposed multiple times and is declined multiple times, then the collaboration system can stop proposing that rule or similar rules. In some cases, this data can be input into machine learning modules that are used to generate the automation rule to refine the rule generation models.

Figure 12:
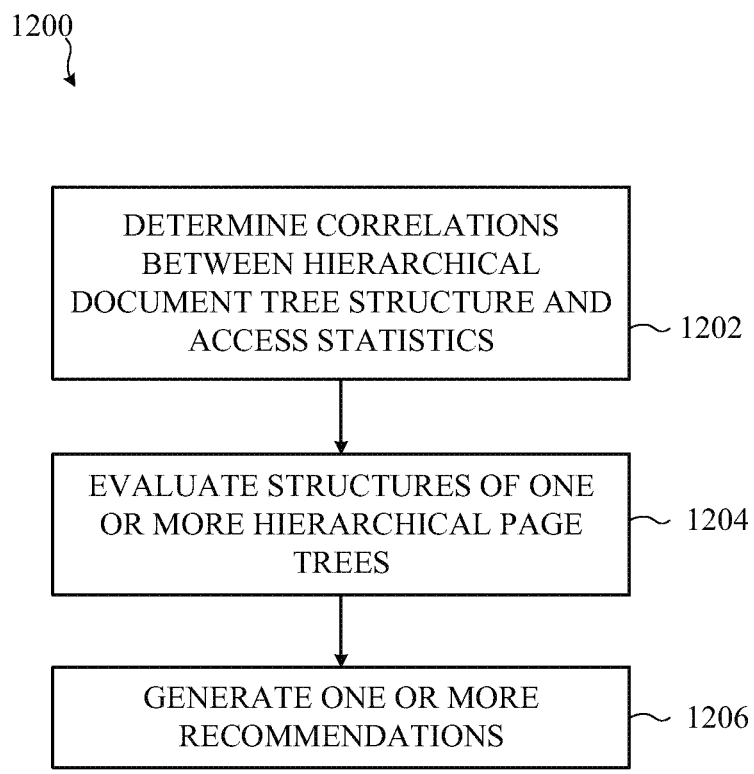
FIG. 12 shows an example process for analyzing hierarchical document trees to generate one or more recommendations for active and archived content.

FIG. 12 shows an example process 1200 for analyzing a hierarchical document tree to generate one or more recommendations for active and archived content. The process 1200 can include performing statistical analysis on the structure and/or organization (e.g., hierarchical organization) of content items hosted by a collaboration platform. The process 1200 can be performed at different levels of the system including at a tenant level, space level, page level, and/or the like. Generally and broadly, the process 1200 can include determining statics relating to content items such as access statistics, and determining relationships between these statistics and a hierarchical structure of the content items (e.g., a level of branching). These access statistics can be used to generate recommendations for changing the structure and/or performing other actions such as archiving. For example, the access statistics may correlate that content items that are highly nested in the hierarchical document tree are less frequently accessed. The content collaboration can then generate a recommendation such as suggesting to archive content items that are beyond a branching threshold, changing the structure of the hierarchical document tree and so on.

Additionally or alternatively, the content collaboration system can analyze archive content items to identify factors common to archived content items. For example, the analysis can include determining access statistics, hierarchical dependency/structure, page tree depth, and so on for content items and identifying statics that are predictive of archiving. The system may use this analysis to generate recommendations for archiving other content items. For example, the access statics analysis can facilitate learning by the collaboration system of what types of content items should be suggested for archiving. Although these examples are given in the context of archiving active content items, these concepts can be applied to archived content items to generate commendations for changes to archived content items, which can include recommendations to unarchive content items, modify a hierarchical structure and so on.

At 1202, the process 1200 can include determining one or more correlations between a structure of a hierarchical document tree and access statistics for content items. For example, the process can include determining a relationship between the branching depth of a content item and how often that content item is accessed. In some cases, the process may identify a correlation between branching depth and access counts, for example, that content items that are beyond a specific branching level are less frequently accessed. This can include using one or more statistical metrics to identify correlations. For example, that content items that are beyond a defined branching level are accessed half as often as content items that are within a branching level. The content collaboration system can use this correlation to generate a recommendation and/or automation rule. The rule could be to recommend archiving all content items that are beyond the defined branching level.

At 1204, the process 1200 can include evaluating the structures of one or more hierarchical page trees to determine if the structure should be changes and/or content items should be archived. For example, the content collaboration system can identify hierarchical document trees that have a hierarchical structure that includes content items that are branched beyond the defined level. Accordingly, the access statistics/correlations that were identified at 1202, can be used to identify changes to the structure of a current hierarchical document trec.

At 1206, the process 1200 can include generating one or more recommendations based on evaluating the structure of the hierarchical page trees. For example, a recommendation can include suggesting archiving of all content items that have a hierarchical structure with branching beyond the defined branching level. In other cases, the content collaboration system can schedule an archiving operation for these content items and alert a user. Accordingly, if no action is taken the identified content items will be archived in accordance with the defined schedule.

Figure 13:
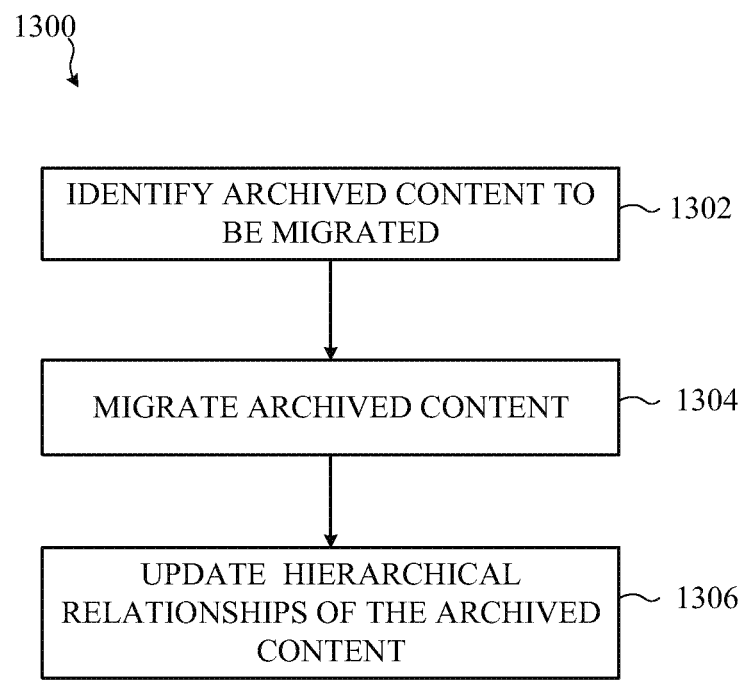
FIG. 13 shows an example process for migrating archived content.

FIG. 13 shows an example process 1300 for migrating archived content. The process 1300 can be initiated in response to migrating content items hosted by a content collaboration system. For example, if active content items for a particular tenant, space, service, server, cloud instances or the like are migrated, the process 1300 can include migrating the archived content items and relationships between the hierarchical content items and the migrated active content. Accordingly, after the migration, the relationships (e.g., hierarchical relationships) between the active and archived content items may be preserved. Additionally or alternatively, the content collaboration system may change a structure, archived status of a content items, and/or other relationships as part of the migration. For example, archived content items may be converted to an active status as part of a migration, which can include restoring their hierarchical relationship to the active content items or defining a new hierarchical relationship as part of the unarchiving process.

At 1302, the process 1300 can include identifying archived content items that are related to active content that is being migrated. For example, as a space, one or pages, cloud instances and so on are being migrated, the process can include identifying content items in an archived data store that have a relationship to the content being migrated. For example, a pointer or link between the archived content items and the un-archived content items, spaces, or tenant, can be maintained. The link or pointer to archived content may also be used to provide indications to the user where archived content may be available with respect to unarchived content displayed in a hierarchical document structure (page tree) or other similar reference. The archived content items may also be stored centrally in a registry or other searchable object that maps un-archived content, spaces, and/or tenant-related information with archived content, which may be used at 1302 to identify archived content items that are to be migrated.

At 1304, the process 1300 can include migrating the archived content. In some cases, this can include moving the archived content from a first archived data store and to a second archived data store. In other cases, this can include updating pointers or other location information for the archived content items, or other suitable process.

At 1306, the process 1300 can include updating the hierarchical relationships between the active and archived content that has been migrated. Accordingly, when the active content items are migrated the hierarchical relationships of these content items to archived content is also updated such that after migration, the relationships between the active and archived content is maintained.

Figure 14:
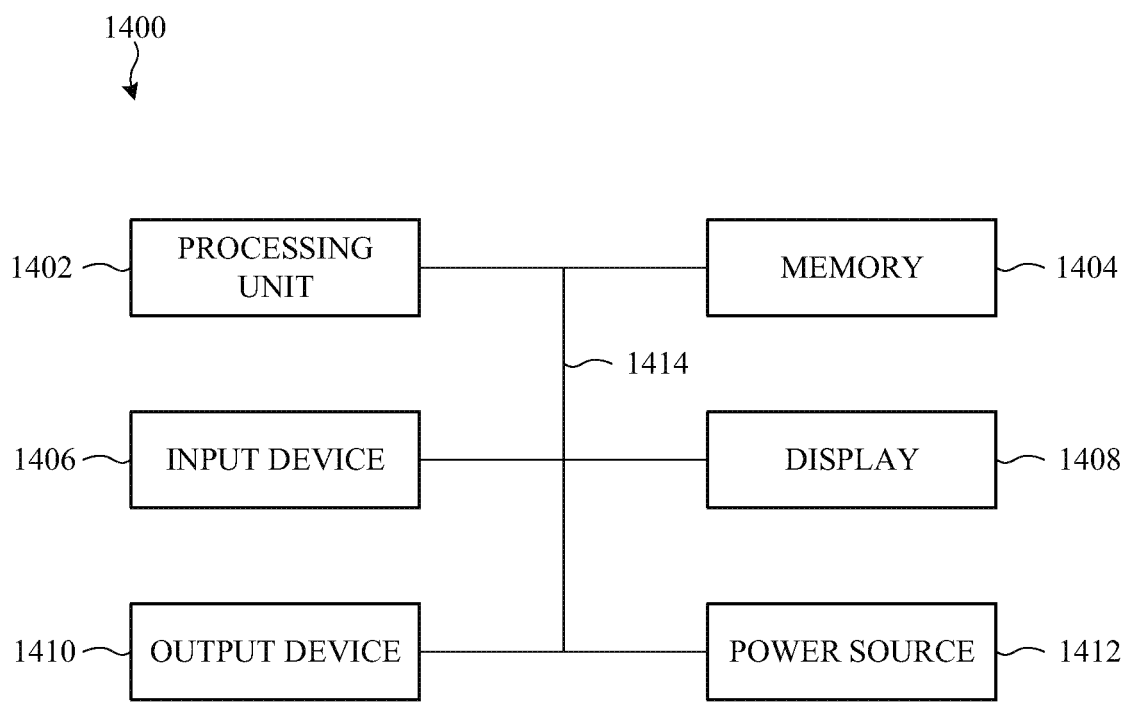
FIG. 14 shows a sample electrical block diagram of an electronic device that may perform the operations described herein.

FIG. 14 shows a sample electrical block diagram of an electronic device 1400 that may perform the operations described herein. The electronic device 1400 may in some cases take the form of any of the electronic devices described with reference to FIGS. 1-13, including client devices, and/or servers or other computing devices associated with the collaboration system 100. The electronic device 1400 can include one or more of a display 1408, a processing unit 1402, a power source 1412, a memory 1404 or storage device, input devices 1406, and output devices 1410. In some cases, various implementations of the electronic device 1400 may lack some or all of these components and/or include additional or alternative components.

The processing unit 1402 can control some or all of the operations of the electronic device 1400. The processing unit 1402 can communicate, either directly or indirectly, with some or all of the components of the electronic device 1400. For example, a system bus or other communication mechanism 1414 can provide communication between the processing unit 1402, the power source 1412, the memory 1404, the input device(s) 1406, and the output device(s) 1410.

The processing unit 1402 can be implemented as any electronic device capable of processing, receiving, or transmitting data or instructions. For example, the processing unit 1402 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1400 can be controlled by multiple processing units. For example, select components of the electronic device 1400 (e.g., an input device 1406) may be controlled by a first processing unit and other components of the electronic device 1400 (e.g., the display 1408) may be controlled by a second processing unit, where the first and second processing units may or may not be in communication with each other.

The power source 1412 can be implemented with any device capable of providing energy to the electronic device 1400. For example, the power source 1412 may be one or more batteries or rechargeable batteries. Additionally or alternatively, the power source 1412 can be a power connector or power cord that connects the electronic device 1400 to another power source, such as a wall outlet.

The memory 1404 can store electronic data that can be used by the electronic device 1400. For example, the memory 1404 can store electronic data or content such as, for example, audio and video files, documents and applications, device settings and user preferences, timing signals, control signals, and data structures or databases. The memory 1404 can be configured as any type of memory. By way of example only, the memory 1404 can be implemented as random access memory, read-only memory, Flash memory, removable memory, other types of storage elements, or combinations of such devices.

In various embodiments, the display 1408 provides a graphical output, for example associated with an operating system, user interface, and/or applications of the electronic device 1400 (e.g., a chat user interface, an issue-tracking user interface, an issue-discovery user interface, etc.). In one embodiment, the display 1408 includes one or more sensors and is configured as a touch-sensitive (e.g., single-touch, multi-touch) and/or force-sensitive display to receive inputs from a user. For example, the display 1408 may be integrated with a touch sensor (e.g., a capacitive touch sensor) and/or a force sensor to provide a touch- and/or force-sensitive display. The display 1408 is operably coupled to the processing unit 1402 of the electronic device 1400.

The display 1408 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1408 is positioned beneath and viewable through a cover that forms at least a portion of an enclosure of the electronic device 1400.

In various embodiments, the input devices 1406 may include any suitable components for detecting inputs.

Examples of input devices 1406 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1406 may be configured to detect one or more particular types of input and provide a signal (e.g., an input signal) corresponding to the detected input. The signal may be provided, for example, to the processing unit 1402.

As discussed above, in some cases, the input device(s) 1406 include a touch sensor (e.g., a capacitive touch sensor) integrated with the display 1408 to provide a touch-sensitive display. Similarly, in some cases, the input device(s) 1406 include a force sensor (e.g., a capacitive force sensor) integrated with the display 1408 to provide a force-sensitive display.

The output devices 1410 may include any suitable components for providing outputs. Examples of output devices 1410 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1410 may be configured to receive one or more signals (e.g., an output signal provided by the processing unit 1402) and provide an output corresponding to the signal.

In some cases, input devices 1406 and output devices 1410 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1402 may be operably coupled to the input devices 1406 and the output devices 1410. The processing unit 1402 may be adapted to exchange signals with the input devices 1406 and the output devices 1410. For example, the processing unit 1402 may receive an input signal from an input device 1406 that corresponds to an input detected by the input device 1406. The processing unit 1402 may interpret the received input signal to determine whether to provide and/or change one or more outputs in response to the input signal. The processing unit 1402 may then send an output signal to one or more of the output devices 1410, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and operations presented with respect to methods and techniques described herein are meant as exemplary and accordingly are not exhaustive. One may further appreciate that alternate operation order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed for leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated for leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for managing archiving of content items associated with a content collaboration system, the method comprising:
  displaying a hierarchical document tree in a first user interface instance associated with a first user account, the hierarchical document tree comprising graphical objects corresponding to content items hosted by the content collaboration system, the graphical objects arranged according to a hierarchical relationship of the content items;
  receiving, from a first client device associated with the first user account, a selection of a graphical object corresponding to a content item;
  in response to receiving the selection of the graphical object:
    assigning an archived status to the content item;
    generating a first updated hierarchical relationship of the content items, the first updated hierarchical relationship based on the hierarchical relationship of the content items and indicating the archived status of the content item;
    constructing a first hierarchical document tree instance for displaying the graphical objects for the first user account, the first hierarchical document tree instance based on the first updated hierarchical relationship of the content items and comprising a graphical object that indicates the archived status of the content item;
    generating a second updated hierarchical relationship of the content items that excludes the content item and defines a new hierarchical relationship for a second content item that depended from the archived content item;
    constructing a second hierarchical document tree instance for displaying the graphical objects for a second user account, the second hierarchical document tree instance based on the second updated hierarchical relationship of the content items and having the new hierarchical relationship for the second content item and the graphical object for the archived content item removed from the second hierarchical document tree instance;
  in response to the first client device requesting display of the hierarchical document tree, displaying in the first user interface instance the first hierarchical document tree instance; and
  in response to a second client device associated with the second user account requesting display of the hierarchical document tree, displaying in a second user interface instance the second hierarchical document tree instance.

2. The method of claim 1, wherein:
  the content item is a first content item;
  the hierarchical relationship of the content items comprises:
    a parent node;
    the first content item depends from the parent node; and
    a second content item of the content items this is dependent from the first content item; and
  generating the second updated hierarchical relationship comprises updating the second content item to depend from the parent node.

3. The method of claim 1, further comprising, in response to assigning the archived status to the content item:
  moving the content item to an archived data store; and
  modifying the first updated hierarchical relationship of the content items for the first user account to reference a storage location of the content item in the archived data store.

4. The method of claim 1, further comprising, in response to assigning the archived status to the content item constructing an archived data structure for the content item, the archived data structure defining an archived hierarchical relationship of the content item with respect to other archived content items.

5. The method of claim 4, wherein the archived hierarchical relationship of the content items with respect to the other archived content items is derived from the hierarchical relationship of the content item with respect to the content items of the content collaboration system.

6. The method of claim 4, further comprising, in response to receiving the selection of the graphical object, receiving from the first client device, an indication of an archived parent node for the content item, wherein the archived hierarchical relationship of the content item with respect to the other archived content items is based on the archived parent node.

7. The method of claim 1, further comprising:
receiving from the first client device, a request to change the archived status of the content item to unarchived status; and
in response to response to receiving the request to change the archived status of the content item to the unarchived status:
assigning an active status to the content item;
determining a parent node for the content item;
generating a third updated hierarchical relationship of the content items, the third updated hierarchical relationship based on the parent node for the content item; and
constructing a third hierarchical document tree instance for displaying the graphical objects for the first user account and the second user account, the third hierarchical document tree instance based on the third updated hierarchical relationship.

8. The method of claim 7, wherein:
in response to the first client device requesting display of the hierarchical document tree, displaying in the first user interface instance the third hierarchical document tree instance; and
in response to the second client device associated with the second user account requesting display of the hierarchical document tree, displaying in the second user interface instance the third hierarchical document tree instance.

9. The method of claim 7, wherein determining the parent node from the content item comprises receiving a section of the parent node from the first client device.

10. A method for administering archiving of content items associated with a content collaboration system, the method comprising:
displaying a hierarchical document tree in a user interface instance associated with an administrative account, the hierarchical document tree comprising graphical objects corresponding to content items associated with multiple user accounts;
receiving, from a client device associated with the administrative account, a selection of a graphical object corresponding to a content item associated with a second user account;
in response to receiving the selection of the graphical object:
assigning an archived status to the content item, the archived status preventing editing of the content item at the content collaboration system;
generating an updated hierarchical relationship of the content items, the updated hierarchical relationship based on a hierarchical relationship of the content items associated with the multiple user accounts and indicating the archived status of the content item;
constructing a hierarchical document tree instance for displaying the graphical objects for the administrative account, the hierarchical document tree instance based on the updated hierarchical relationship of the content items and comprising first graphical objects indicating an active status of a first set of the content items and a second graphical object, different from the first graphical objects, indicating the archived status of the content item a; and
in response to the client device requesting display of the hierarchical document tree, displaying in the user interface instance the hierarchical document tree instance.

11. The method of claim 10, wherein the updated hierarchical relationship is a first updated hierarchical relationship and the hierarchical document tree instance is a first hierarchical document tree instance and further comprising:
generating a second updated hierarchical relationship of the content items that excludes the content item;
constructing a second hierarchical document tree instance for displaying the graphical objects for a third user account, the second hierarchical document tree instance displaying based on the second updated hierarchical relationship of the content items; and
in response to a third client device associated with the third user account requesting display of the hierarchical document tree, displaying in a third user interface instance the second hierarchical document tree instance.

12. The method of claim 11, further comprising, in response to assigning the archived status to the content item:
moving the content item to an archived data store; and
modifying the first and second updated hierarchical relationships of the content items to reference a storage location of the content item in the archived data store.

13. The method of claim 10, further comprising generating an archived hierarchical relationship of the content item with respect to other archived content items, wherein the archived hierarchical relationship of the content items with respect to the other archived content items is derived from the hierarchical relationship of the content item with respect to the content items of the content collaboration system.

14. The method of claim 13, further comprising, in response to receiving the selection of the graphical object, receiving from the client device, an indication of an archived parent node for the content item, wherein the archived hierarchical relationship of the content item with respect to the other archived content items is based on the archived parent node.

15. The method of claim 10, wherein the graphical objects are arranged according to the hierarchical relationship of the content items.

16. A method for managing archiving actions at a content collaboration system, the method comprising:
displaying a hierarchical document tree in a navigation pane of a user interface for the content collaboration system, the hierarchical document tree comprising graphical objects corresponding to content items hosted by the content collaboration system;
determining that one or more of the content items satisfy a first criteria;
in response to determining that the one or more content items that satisfy the first criteria:
archiving the one or more content items, the archiving of the one or more content items preventing editing of the one or more content items within the user interface of the content collaboration system;
constructing a second hierarchical document tree having graphical objects associated with the one or more content items removed; and
constructing an archived hierarchical document tree comprising graphical objects corresponding to the one or more content items selected for archiving, the archived hierarchical document tree arranged according to a hierarchical relationship of the one or more content items;

determining that an archived content items satisfies a second criteria;

in response to determining that the archived content items that satisfies the second criteria:

receiving a selection of a parent node for the archived content item;

restoring access to the archived content item; and constructing a third hierarchical document tree comprising a graphical object corresponding to the restored archived content item arranged according to the selection of the parent node.

17. The method of claim 16, wherein the first criteria comprises at least one of an age of the content item, usage metric of the content item, a last viewed date of the content item and a last updated date of the content item.

18. The method of claim 16, wherein the first criteria comprises at least one of a number of links to the content item or a number of links from the content item.

19. The method of claim 16, further comprising in response to determining that the one or more content items that satisfy the first criteria, prompting a user to approve a change of the one or more content items to an archived status; and in response to the user approving the change to the archived status, archiving the one or more content items.

20. The method of claim 16, further comprising:

in response to determining that the one or more content items that satisfy the first criteria, determine that the one or more content items comprise a whitelisted status; and in response to determining that the one or more content items comprises the whitelisted status, maintaining the one or more content items in an active status.

* * * * *